United States Patent
Okura

(10) Patent No.: US 10,464,613 B2
(45) Date of Patent: Nov. 5, 2019

(54) SUPPORTING STRUCTURE FOR VEHICLE HIGH-VOLTAGE UNIT AND VEHICLE FRONT PORTION STRUCTURE

(71) Applicant: TOYOTA JIDOSHA KABUSHIKI KAISHA, Aichi-ken (JP)

(72) Inventor: Daiki Okura, Seto (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 16/175,839

(22) Filed: Oct. 31, 2018

(65) Prior Publication Data

US 2019/0126989 A1 May 2, 2019

(30) Foreign Application Priority Data

Nov. 2, 2017 (JP) .................... 2017-212452
Feb. 9, 2018 (JP) .................... 2018-021775

(51) Int. Cl.
| | |
|---|---|
| *B60K 1/04* | (2019.01) |
| *B62D 25/08* | (2006.01) |
| *B60K 1/00* | (2006.01) |
| *B62D 21/15* | (2006.01) |
| *B60K 5/12* | (2006.01) |

(52) U.S. Cl.
CPC ............ *B62D 25/085* (2013.01); *B60K 1/00* (2013.01); *B60K 1/04* (2013.01); *B60K 5/12* (2013.01); *B62D 21/152* (2013.01); *B62D 25/08* (2013.01); *B60K 2001/0411* (2013.01); *B60Y 2306/01* (2013.01)

(58) Field of Classification Search
CPC .......... B60K 5/00; B60K 5/1216; B60K 5/12; F16F 13/10
See application file for complete search history.

(56) References Cited

U.S. PATENT DOCUMENTS

| | | | | |
|---|---|---|---|---|
| 8,042,793 | B2* | 10/2011 | Igami .................... | F16F 1/3835 180/297 |
| 9,205,733 | B2* | 12/2015 | Olsen .................... | B60K 5/1208 |
| 2013/0248275 | A1* | 9/2013 | Cunningham ........... | B60K 1/00 180/299 |

FOREIGN PATENT DOCUMENTS

| | | |
|---|---|---|
| EP | 1674316 A1 | 6/2006 |
| JP | 2002-349632 A | 12/2002 |
| JP | 2004-314803 A | 11/2004 |
| JP | 2015-89750 A | 5/2015 |
| JP | 2017-30579 A | 2/2017 |
| JP | 2017-47780 A | 3/2017 |

\* cited by examiner

*Primary Examiner* — James A Shriver, II
*Assistant Examiner* — James J Triggs
(74) *Attorney, Agent, or Firm* — Hauptman Ham, LLP

(57) ABSTRACT

A vehicle front portion structure includes: a pair of front side members extending in a vehicle front-rear direction, the front side members being disposed at an interval in a vehicle width direction; an MC cross-member suspended between the front side members, the MC cross-member being provided with a front cross portion extending in the vehicle width direction and a rear cross portion provided behind the front cross portion and extending in the vehicle width direction; and motor mounts configured to connect a high-voltage component to the MC cross-member, the motor mounts being suspended between the front cross portion and the rear cross portion.

20 Claims, 19 Drawing Sheets

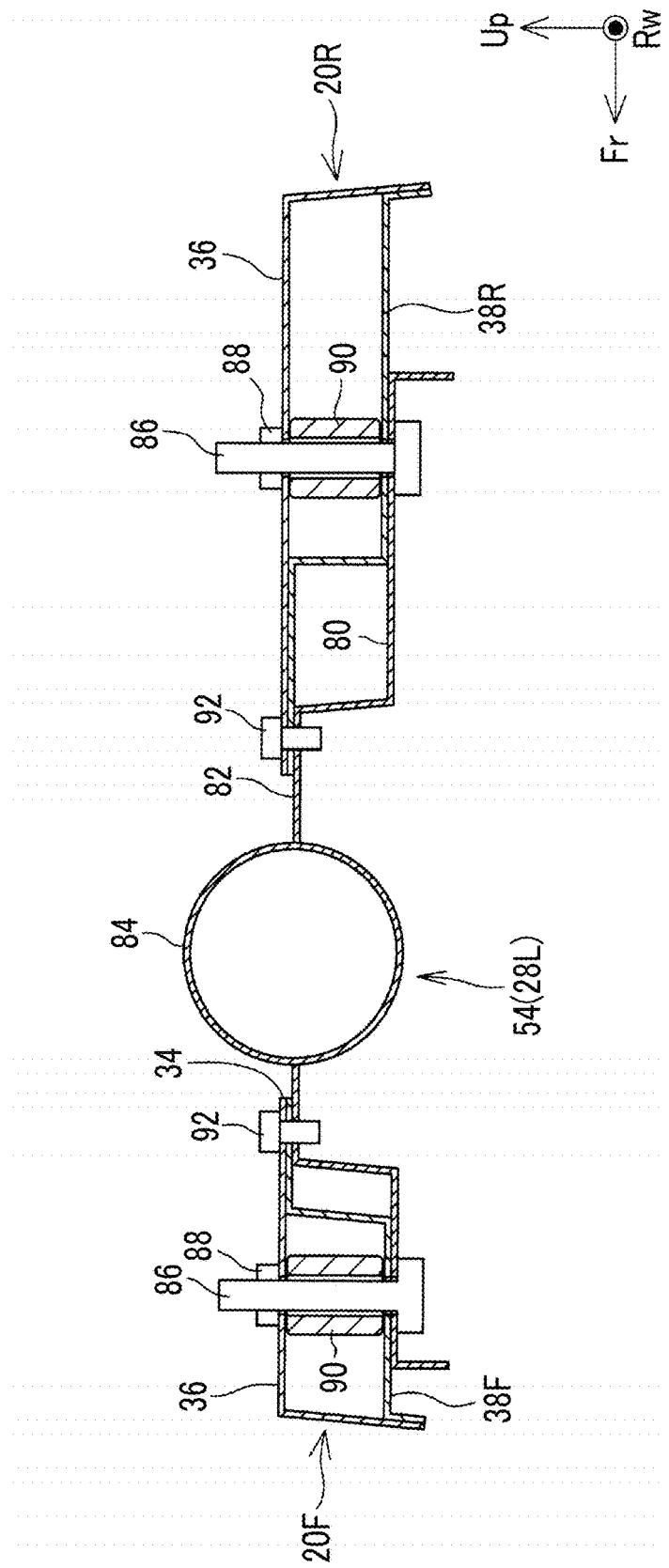

SUPPORTING STRUCTURE FOR VEHICLE HIGH-VOLTAGE UNIT AND VEHICLE FRONT PORTION STRUCTURE

INCORPORATION BY REFERENCE

The disclosures of Japanese Patent Application No. 2017-212452 filed on Nov. 2, 2017 and Japanese Patent Application No. 2018-021775 filed on Feb. 9, 2018, including the specifications, drawings and abstracts are incorporated herein by reference in their entireties.

BACKGROUND

1. Technical Field

The disclosure relates to a supporting structure for a vehicle high-voltage unit and a vehicle front portion structure including the supporting structure.

2. Description of Related Art

For example, as described in Japanese Unexamined Patent Application Publication No. 2004-314803 (JP 2004-314803 A), a vehicle front portion of an electric automobile is provided with a power unit chamber (hereinafter, may be referred to as motor compartment) in which a rotating electrical machine as a drive source is installed.

In the power unit chamber, the rotating electrical machine is supported by a vehicle skeleton member. For example, in a motor generator (MG) compartment, a pair of front side members extends in a vehicle front-rear direction as a skeleton member. A motor compartment cross-member (hereinafter, appropriately referred to as MC cross-member) is provided to be suspended between the front side members in a vehicle width direction. The rotating electrical machine (drive machine) is installed on the MC cross-member.

As illustrated in FIG. 10, an MC cross-member 120 has an approximately rectangular shape and an opening portion 134 is formed in the central portion of the MC cross-member 120. For example, a rotating electrical machine 122 is attached to a lower portion of the MC cross-member 120. A power control unit 124 (hereinafter, appropriately referred to as PCU) performing power conversion, a charger 126 and the like are installed on an upper portion of the MC cross-member 120. In the opening portion 134 of the MC cross-member 120, a high-voltage cable (not shown) connecting the PCU 124 and the rotating electrical machine 122 is routed. The rotating electrical machine 122, the PCU 124, the charger 126, and the like are attached to the MC cross-member 120 to obtain a high-voltage unit and the high-voltage unit is fastened to a front side members 112A, 112B via the MC cross-member 120.

SUMMARY

Meanwhile, at the time of a frontal collision of a vehicle, particularly at the time of a full-wrap collision in which substantially the entire width of a vehicle front portion collides with a collision object, the MC cross-member may be deformed due to a collision load applied to the MC cross-member. For example, when the collision load is input, the opening portion of the MC cross-member is deformed such that the opening portion is crushed. There is a possibility that the high-voltage cable disposed (routed) in the opening portion is pressed since the opening portion is crushed. There is a desire for an improvement in rigidity of the MC cross-member for protection of a high-voltage component installed on the MC cross-member. The disclosure provides a supporting structure for a vehicle high-voltage unit and a vehicle front portion structure with which it is possible to suppress deformation of an MC cross-member in comparison with the related art.

A first aspect of the disclosure relates to a vehicle front portion structure including a pair of front side members, an MC cross-member, and motor mounts. The front side members are disposed at an interval in a vehicle width direction and each of the front side members extends in a vehicle front-rear direction. The MC cross-member is suspended between the front side members and the MC cross-member is provided with a front cross portion extending in the vehicle width direction and a rear cross portion provided behind the front cross portion and extending in the vehicle width direction. The motor mounts are configured to connect a high-voltage component to the MC cross-member and the motor mounts are suspended between the front cross portion and the rear cross portion.

According to the first aspect of the disclosure, since the motor mounts are suspended between the front cross portion and the rear cross portion, the front cross portion is effectively suppressed from being deformed in a direction toward the rear cross portion. As a result, it is possible to suppress deformation of the MC cross-member in comparison with the related art.

In the vehicle front portion structure according to the first aspect of the disclosure, the MC cross-member may be provided with an upper member that forms an upper surface of the MC cross-member and lower members that form a bottom surface of the MC cross-member. The upper member and the lower members may be connected to each other such that a closed section is formed. A bolt penetrating the closed section and a nut screwed onto the bolt may hold the motor mounts, the upper member, and the lower members together.

In this case, since the bolt penetrates the closed section, the attachment rigidity of the bolt and the torsional rigidity of the MC cross-member are improved.

In the vehicle front portion structure according to the first aspect of the disclosure, each of the motor mounts may be provided with a base portion that is fastened to bottom surfaces or upper surfaces of the front cross portion and the rear cross portion and a protruding portion that protrudes in a vehicle height direction from a central portion of the base portion. When the base portion is fastened to the front cross portion and the rear cross portion, the protruding portion may be positioned in a gap between the front cross portion and the rear cross portion.

According to the first aspect of the disclosure, even when the front cross portion is about to be deformed toward a vehicle rear side, the front cross portion abuts onto the protruding portion. Therefore, deformation of the front cross portion and deformation of the MC cross-member are effectively suppressed.

The vehicle front portion structure according to the first aspect of the disclosure may further include a gusset which is attached to each of outer surfaces of the front side members in the vehicle width direction, which protrudes outward in the vehicle width direction further than the front side members, and of which a dimension in the vehicle width direction becomes smaller toward a vehicle rear side. The MC cross-member and the front side members may face each other in a state of being separated from each other in the vehicle width direction at the same position as a rear end of the gusset in the vehicle front-rear direction.

Here, a position on the front side member that is at the same position as the rear end of the gusset in the vehicle front-rear direction is a position to which a stress is likely to be concentrated at the time of the small overlap collision or the oblique collision and at which the front side member is likely to be bent. Since the MC cross-member and the front side member face each other in a state of being separated from each other in the vehicle width direction at a position at which the front side member is likely to be bent, the front side member can be reliably bent. Since the front side member is bent, a collision load can be transmitted from the front side member to the front side member on the opposite side via the MC cross-member. That is, a collision load at the time of the small overlap collision or the oblique collision can be transmitted to the front side member on the opposite side not via a power unit.

In the vehicle front portion structure according to the first aspect of the disclosure, one or more projecting walls may be provided on an outer surface of the MC cross-member in the vehicle width direction at the same position as the rear end of the gusset in the vehicle front-rear direction or at a position behind the rear end of the gusset in the vehicle front-rear direction. The projecting wall may project outward in the vehicle width direction further than a portion of the outer surface that is ahead of the projecting wall.

According to the first aspect of the disclosure, a rearward movement of the bent front side member is restrained by the projecting wall. As a result, a collision load is not likely to escape to the vehicle rear side and the collision load can be more reliably transmitted to the MC cross-member from the front side member.

In the vehicle front portion structure according to the first aspect of the disclosure, an end surface of each of the front side members in the vehicle width direction may be provided with a reinforcement rib extending in the vehicle front-rear direction, the reinforcement rib being partially discontinuous. The projecting wall may be provided at the same position as a discontinuation position of the reinforcement rib in the vehicle front-rear direction or at a position behind the discontinuation position of the reinforcement rib in the vehicle front-rear direction.

Here, the discontinuation position of the reinforcement rib is also a position to which a stress is likely to be concentrated at the time of the small overlap collision or the oblique collision and at which the front side member is likely to be bent. Since the projecting wall is provided at the same position as a position at which the front side member is likely to be bent in the vehicle front-rear direction or at a position behind the position at which the front side member is likely to be bent in the vehicle front-rear direction, a rearward movement of the front side member is more reliably suppressed and the collision load can be more reliably transmitted to the MC cross-member from the front side member.

In the vehicle front portion structure according to the first aspect of the disclosure, a height dimension of an end portion of the MC cross-member in the vehicle width direction may be larger than a height dimension of a central portion of the MC cross-member in the vehicle width direction.

According to the first aspect of the disclosure, the area of an end surface of the MC cross-member in the vehicle width direction is likely to become large and the front side member and the MC cross-member more reliably come into contact with each other when the front side member is bent.

The vehicle front portion structure according to the first aspect of the disclosure may further include supporting brackets configured to connect the MC cross-member and the front side members to each other in a state where the MC cross-member and the front side members are separated from each other in the vehicle width direction.

Since the supporting brackets are used, a space in which the front side member can be bent can be easily secured between the MC cross-member and the front side member.

In the vehicle front portion structure according to the first aspect of the disclosure, the MC cross-member may be provided with an upper member that forms an upper surface of the MC cross-member and lower members that form a bottom surface of the MC cross-member. The upper member and the lower members may be connected to each other such that a closed section is formed. First fastening bolts penetrating the closed section and nuts screwed onto the first fastening bolts may hold the supporting brackets, the upper member, and the lower members together.

Since the first fastening bolts penetrate the closed section, the attachment rigidity of the first fastening bolts and the torsional rigidity of the MC cross-member are improved.

In the vehicle front portion structure according to the first aspect of the disclosure, the supporting brackets may be fastened to the MC cross-member and the front side members at a position behind the rear end of the gusset in the vehicle front-rear direction. Each of the supporting brackets may be provided with a plurality of first fastening holes, the first fastening holes being used to fasten the supporting brackets to the MC cross-member and being arranged in the vehicle front-rear direction. Load bearing portions as predetermined gap portions may be respectively interposed between the first fastening holes and inner end portions of the supporting brackets in the vehicle width direction. The strength of the foremost load bearing portion may be higher than that of the other load bearing portions.

According to the first aspect of the disclosure, the supporting brackets can easily rotate following the bending of the front side member.

In the vehicle front portion structure according to the first aspect of the disclosure, the MC cross-member may be further provided with a pair of side portions configured to connect end portions of the front cross portion and the rear cross portion to each other.

According to the first aspect of the disclosure, the area of an end surface of the MC cross-member in the vehicle width direction is likely to become large and the front side member and the MC cross-member more reliably come into contact with each other when the front side member is bent.

A second aspect of the disclosure relates to a supporting structure for a vehicle high-voltage unit. The supporting structure includes a pair of motor mounts and an MC cross-member. The motor mounts are attached to opposite ends of a rotating electrical machine unit in a width direction. Opposite ends of the MC cross-member in a vehicle width direction are fastened to a pair of front side members extending in a vehicle front-rear direction, the rotating electrical machine unit is attached to a lower portion of the MC cross-member via the motor mounts, and a high-voltage device is attached to an upper portion of the MC cross-member. An opening portion vertically penetrating the MC cross-member is formed in a central portion of the MC cross-member and front and rear end portions of each of the motor mounts are fastened to the MC cross-member with the opening portion of the MC cross-member interposed between the front and rear end portions of each of the motor mounts in the vehicle front-rear direction.

According to the second aspect of the disclosure, the front and rear end portions of each of the motor mounts are fastened to the MC cross-member with the opening portion of the MC cross-member interposed between the front and rear end portions in the vehicle front-rear direction. Therefore, when a collision load is applied to the MC cross-member at the time of a frontal collision of a vehicle, a compressive load is applied to the motor mounts via a fastening portion between the MC cross-member and the motor mounts. A compressive stress is generated on the motor mounts against the compressive load. Since the motor mounts are stretched against the compressive load, the opening portion of the MC cross-member is restrained from being crushed.

With the supporting structure for a vehicle high-voltage unit and the vehicle front portion structure according to the aspects of the disclosure, it is possible to suppress deformation of an MC cross-member in comparison with the related art.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein:

FIG. 22 is a schematic sectional view illustrating a state where a member side fastening portion of a left motor mount is fastened to the MC cross-member.

DETAILED DESCRIPTION OF EMBODIMENTS

Figure 1:
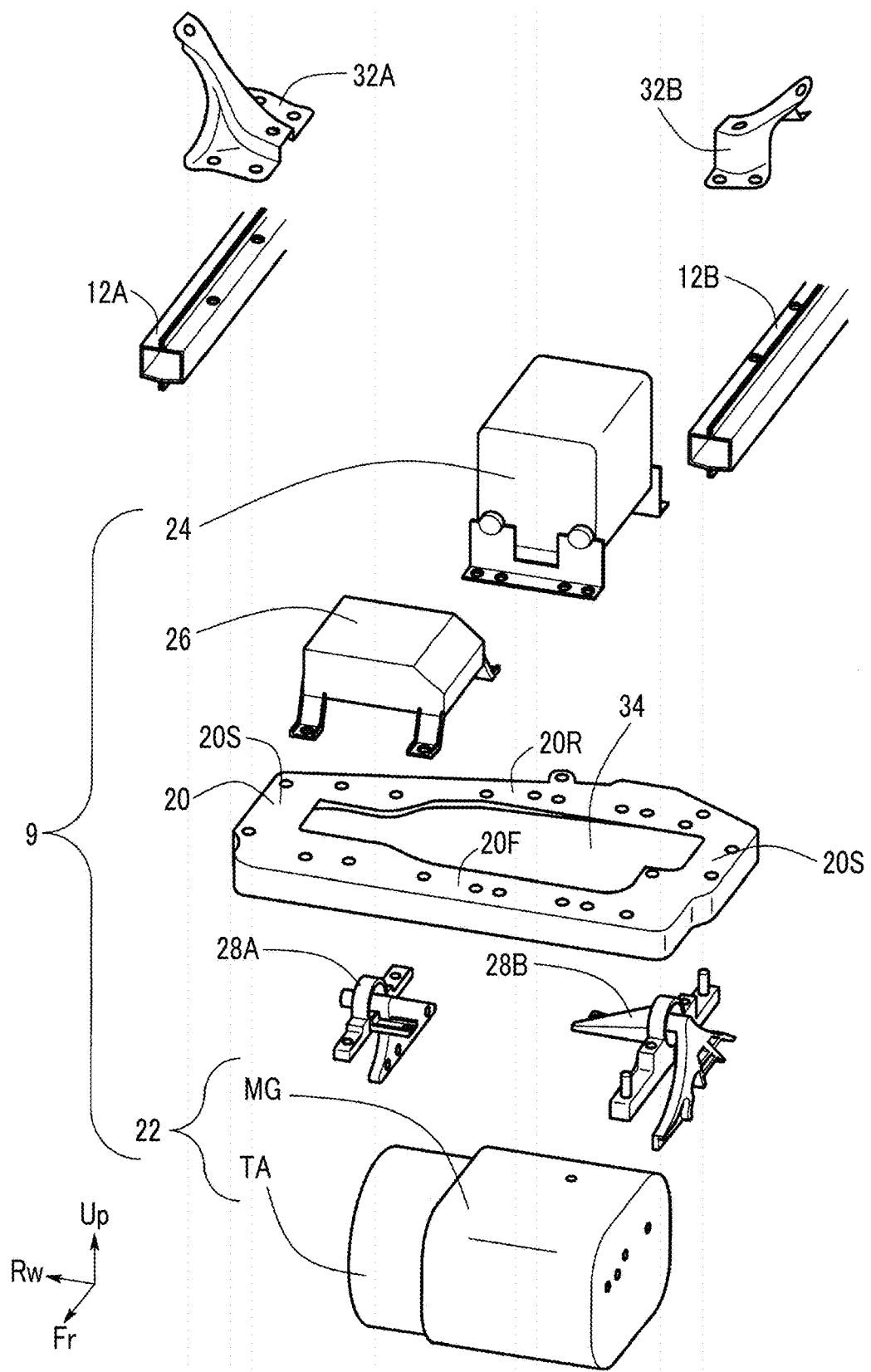
FIG. 1 is an exploded perspective view illustrating devices and members constituting a vehicle high-voltage unit according to an embodiment.

FIG. 1 illustrates a device or a member constituting a vehicle high-voltage unit 9. In FIGS. 1 to 9, a vehicle front-rear direction is illustrated with an axis denoted by a symbol "Fr", a vehicle width direction is illustrated with an axis denoted by a symbol "Rw", and a vertical direction is illustrated with an axis denoted by a symbol "Up". The symbol "Fr" is the abbreviation of "Front" and the positive direction of a front-rear direction axis Fr is a direction toward a front side of a vehicle. The symbol "Rw" is the abbreviation of "Right Width" and the positive direction of a width direction axis Rw is a direction toward a right side in the vehicle width direction. The positive direction of a height axis UP is an upward direction. Unless otherwise noted, "right and left sides" in the following description means right and left sides as seen from an occupant of the vehicle.

As illustrated in FIG. 1, the Fr axis, the Rw axis, and the Up axis are orthogonal to each other. The following description will be appropriately made based on the three axes. For example, the expression "front end" means an end portion of a certain member that is close to the positive side of the Fr axis and the expression "rear end" means an end portion of a certain member that is close to the negative side of the Fr axis. The expression "inner side in the width direction" means a relatively inner side in the width direction parallel to the Rw axis and the expression "outer in the width direction" means a relatively outer side in the width direction parallel to the Rw axis. The expression "upper side" means a side relatively close to the positive side of the Up axis and the expression "lower side" means a side relatively close to the negative side of the Up axis.

The vehicle high-voltage unit 9 is provided with a rotating electrical machine unit 22, a PCU 24, and a charger 26. As a supporting structure for the vehicle high-voltage unit 9, an MC cross-member 20 and a pair of motor mounts 28A, 28B are provided. For example, the vehicle high-voltage unit 9 is installed in a power unit chamber provided in a vehicle front portion of an electric automobile. A water heater may be attached to the MC cross-member 20.

In the power unit chamber, a pair of front side members 12A, 12B extends in the vehicle front-rear direction. The vehicle high-voltage unit 9 is attached to the front side members 12A, 12B. For example, as described later, opposite ends of the MC cross-member 20 in the width direction are fastened to the front side members 12A, 12B via supporting brackets 32A, 32B.

The rotating electrical machine unit 22 is provided with a rotating electrical machine MG which is a drive source of the vehicle and a transmission TA (transaxle). In an example illustrated in FIG. 1, the way in which the rotating electrical machine unit 22 is disposed is a so-called horizontal disposition and the rotating electrical machine unit 22 is disposed in the power unit chamber such that the longitudinal direction of the rotating electrical machine unit 22 becomes parallel to the vehicle width direction.

Figure 2:
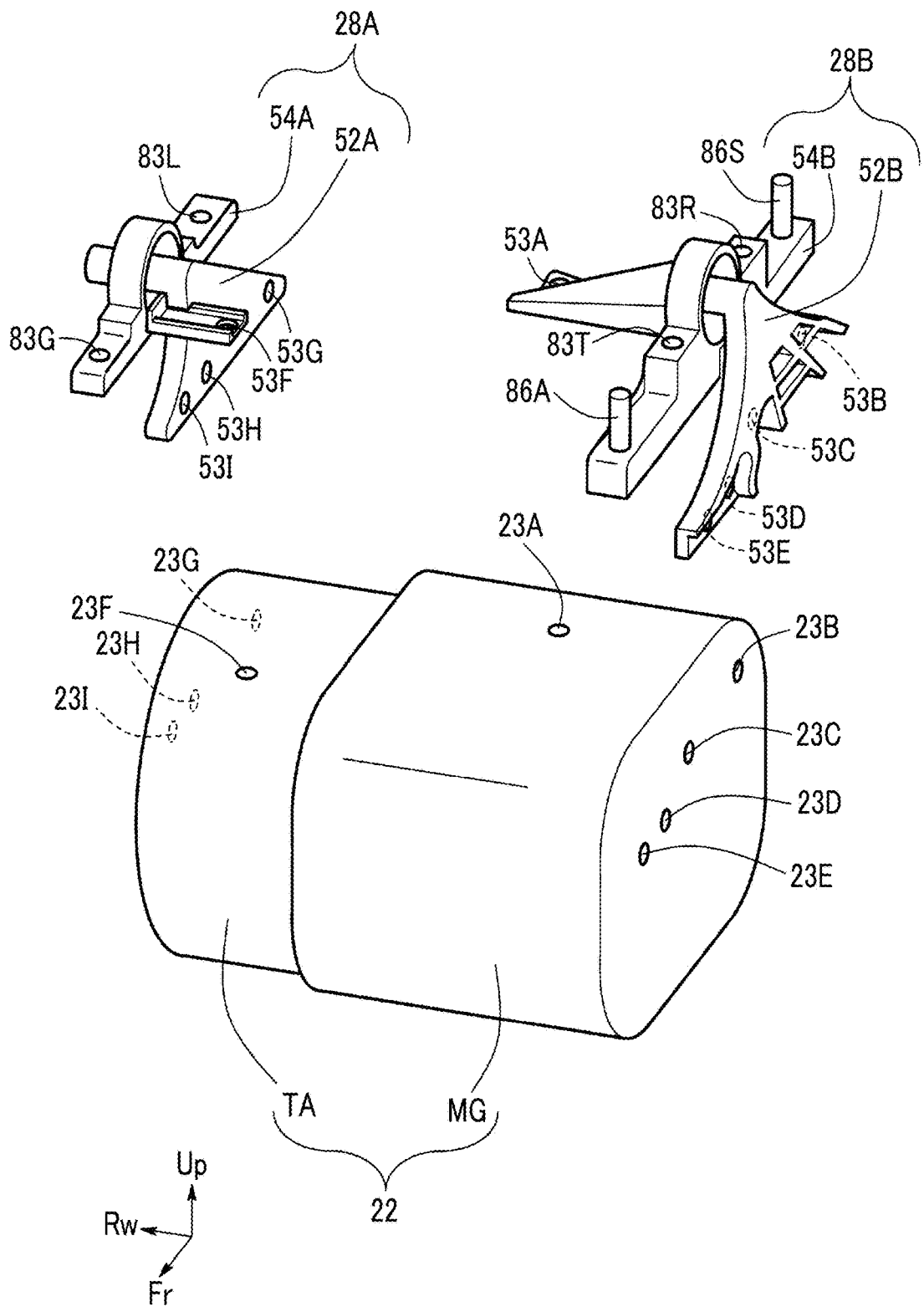
FIG. 2 is a perspective view for describing configurations of a rotating electrical machine unit and motor mounts.

As understood from FIG. 2, opposite ends of the rotating electrical machine unit 22 in the width direction are provided with a plurality of fastening holes. Specifically, fastening holes 23A to 23E are formed in an end of the rotating electrical machine MG in the width direction and an upper surface of the rotating electrical machine MG Fastening holes 23F to 23I are formed in an end of the transmission TA in the width direction and an upper surface of the transmission TA. When the fastening holes 23A to 23I and fastening holes 53A to 53I of the motor mounts 28A, 28B are positionally aligned with each other and bolted together, the motor mounts 28A, 28B are fastened to the rotating electrical machine unit 22.

Referring to FIG. 1 again, the PCU 24 is a power converter provided in an electric circuit connecting the rotating electrical machine MG and a battery (not shown). For example, the PCU 24 is provided with a power conversion circuit such as a DC/DC converter or an inverter. As understood from FIG. 6, fastening holes 83B to 83E are formed in a leg portion 24A that extends downward from a front end portion of the PCU 24 with an insulating member or the like interposed therebetween. Similarly, fastening holes 83N to 83Q are formed in a leg portion 24B that extends downward from a rear end portion of the PCU 24 with an insulating member or the like interposed therebetween.

The charger 26 is connected to the battery (not shown) and is provided with a booster circuit for power conversion, a transformer circuit for blocking direct-current components, and the like. Fastening holes 83F, 83H are formed in a leg portion 26A that extends downward from a front end portion of the charger 26 with an insulating member or the like interposed therebetween. Similarly, fastening holes 83K, 83M are formed in a leg portion 26B that extends downward from a rear end portion of the charger 26 with an insulating member or the like interposed therebetween.

Figure 7:
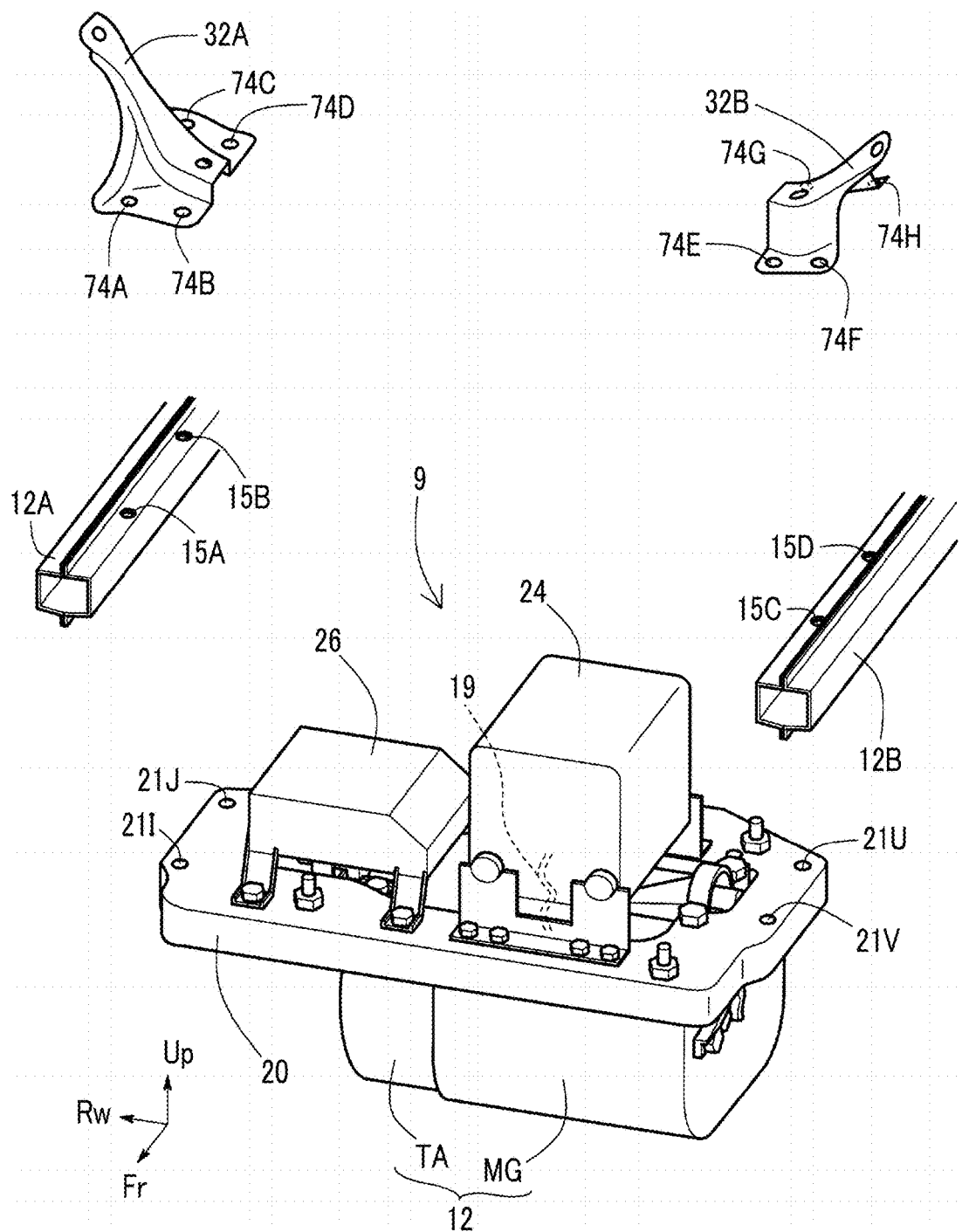
FIG. 7 is a perspective view illustrating a fifth stage of the vehicle high-voltage unit assembling process.

The MC cross-member 20 is a supporting member for the vehicle high-voltage unit 9. As illustrated in FIG. 1, the MC cross-member 20 is disposed in the power unit chamber such that the longitudinal direction of the MC cross-member 20 becomes parallel to the vehicle width direction. The MC cross-member 20 has an approximately rectangular shape and an opening portion 34 that penetrates the MC cross-member 20 in the vertical direction is formed in the central portion of the MC cross-member 20. When seeing from another point of view, it can be said that the MC cross-member 20 is provided with a front cross portion 20F that extends in the vehicle width direction, a rear cross portion 20R that extends in the vehicle width direction while being positioned behind the front cross portion 20F, and a pair of side portions 20S that connects opposite ends of the front cross portion 20F in the width direction and opposite ends of the rear cross portion 20R in the width direction to each other. An area surrounded by the front cross portion 20F, the rear cross portion 20R, and the side portions 20S is the opening portion 34. As illustrated in FIG. 7, a high-voltage cable 19 that connects the PCU 24 and the rotating electrical machine MG is routed in the opening portion 34. A skeleton member surrounding the opening portion 34 has, for example, a structure having a closed section. Although the MC cross-member 20 has the approximately rectangular shape and the central portion of the MC cross-member 20 is provided with the opening portion 34, the front cross portion 20F and the rear cross portion 20R are connected to each other by the side portions 20S such that the strength of the MC cross-member 20 is improved.

As illustrated in FIG. 1, high-voltage devices such as the PCU 24 and the charger 26 are attached to an upper portion of the MC cross-member 20. The rotating electrical machine unit 22 is attached to a lower portion of the MC cross-member 20. As described later, the rotating electrical machine unit 22 is attached to the MC cross-member 20 via the motor mounts 28A, 28B.

Figure 4:
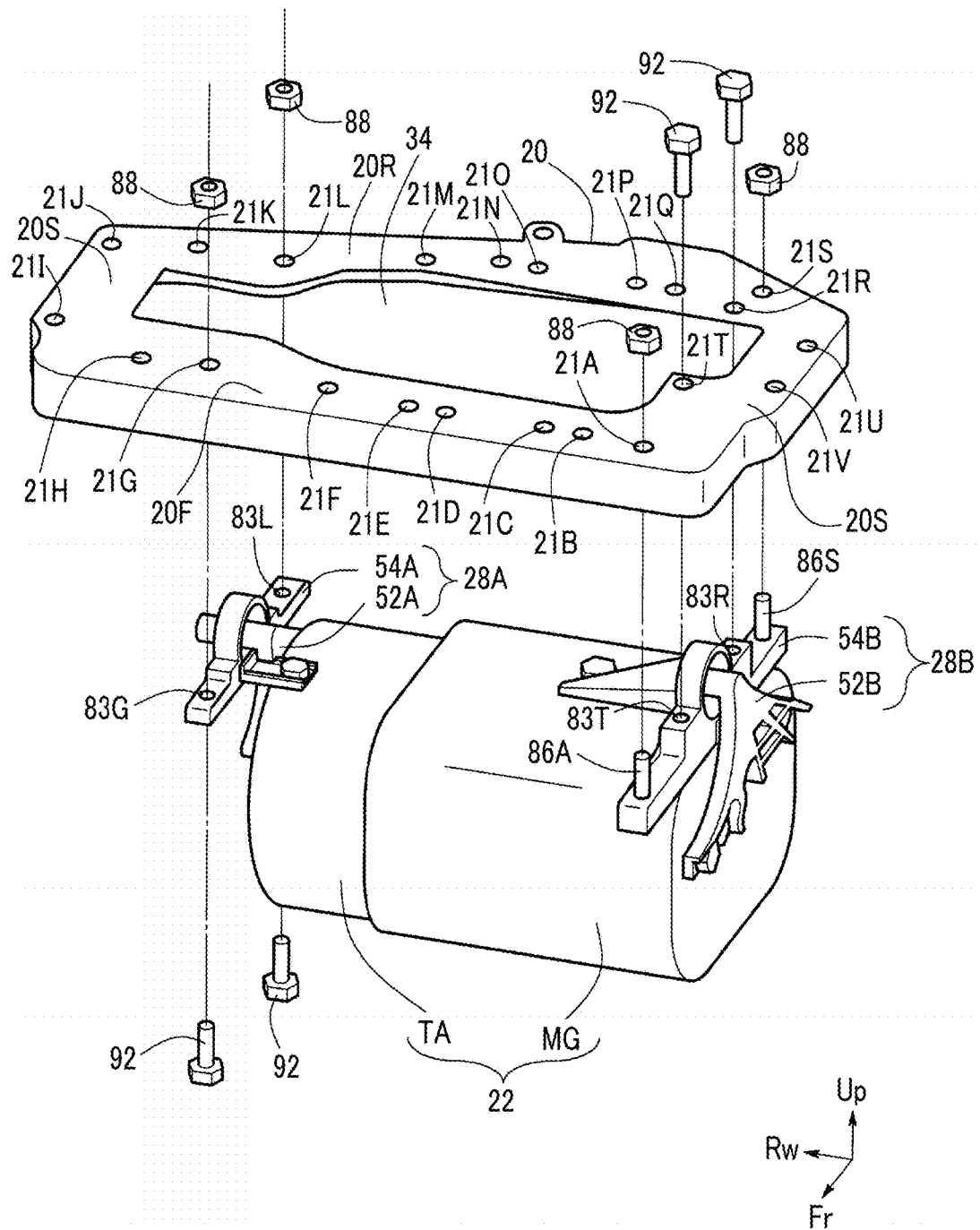
FIG. 4 is a perspective view illustrating a second stage of the vehicle high-voltage unit assembling process.

As illustrated in FIG. 4, the MC cross-member 20 is provided with a plurality of fastening holes 21A to 21V. When the fastening holes 21A to 21V and fastening holes or stud bolts provided for the charger 26, the PCU 24, and the motor mounts 28A, 28B are positionally aligned with each other and bolted together, the charger 26, the PCU 24, and the rotating electrical machine unit 22 are attached to the MC cross-member 20.

As understood from FIG. 2, the motor mount 28A is provided with an MG side fastening portion 52A that is fastened to the rotating electrical machine unit 22 and a member side fastening portion 54A that is fastened to the MC cross-member 20. The MG side fastening portion 52A extends in the front-rear direction and a plurality of fastening holes 53F to 53I is formed such that the fastening holes 53F to 53I are arranged in a direction in which the MG side fastening portion 52A extends. As with the MG side fastening portion 52A, the member side fastening portion 54A extends in the front-rear direction. Fastening holes 83G, 83L are provided to be arranged in a direction in which the member side fastening portion 54A extends. As described later, the fastening holes 83G, 83L of front and rear ends of the member side fastening portion 54A and the fastening holes 21G, 21L of the MC cross-member 20 are positionally aligned with each other and bolted together with the opening portion 34 of the MC cross-member 20 interposed between the fastening holes 83G, 83L in the front-rear direction. In other words, the member side fastening portion 54A (motor mount 28A) is suspended between the front cross portion 20F and the rear cross portion 20R.

The motor mount 28B is provided with an MG side fastening portion 52B that is fastened to the rotating electrical machine unit 22 and a member side fastening portion 54B that is fastened to the MC cross-member 20. The MG side fastening portion 52B extends in the front-rear direction and a plurality of fastening holes 53A to 53E is formed such that the fastening holes 53A to 53E are arranged in a direction in which the MG side fastening portion 52B extends. As with the MG side fastening portion 52B, the member side fastening portion 54B extends in the front-rear direction. Stud bolts 86A, 86S and fastening holes 83R, 83T are provided to be arranged in a direction in which the member side fastening portion 54B extends. As described later, the stud bolts 86A, 86S and the fastening holes 83R, 83T of front and rear ends of the member side fastening portion 54B and the fastening holes 21A, 21S, 21R, 21T of the MC cross-member 20 are positionally aligned with each other and bolted together with the opening portion 34 of the MC cross-member 20 interposed between the stud bolts 86A, 86S and between the fastening holes 83R, 83T in the front-rear direction. In other words, the member side fastening portion 54B (motor mount 28B) is suspended between the front cross portion 20F and the rear cross portion 20R.

Vehicle High-Voltage Unit Assembling Process

Figure 3:
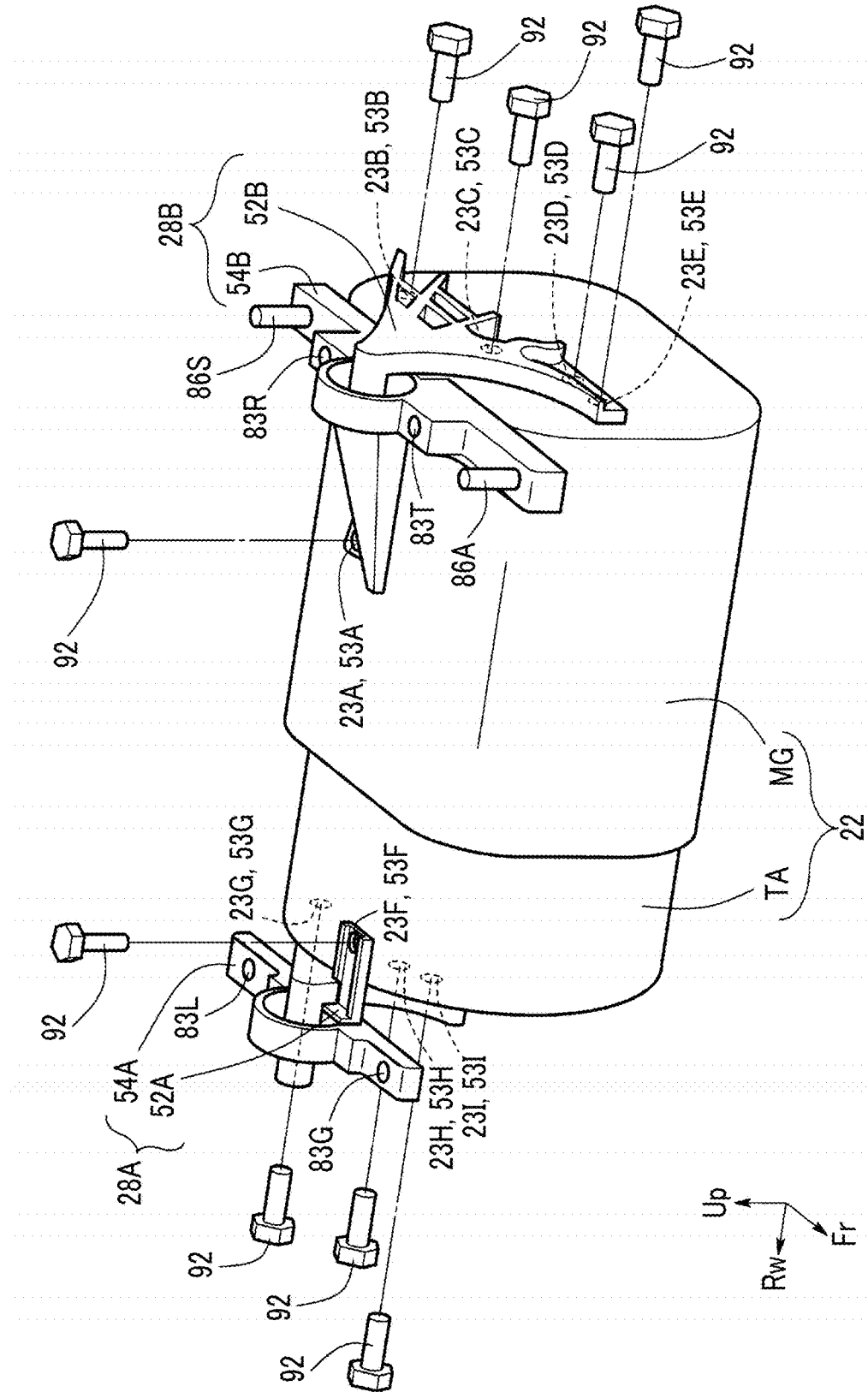
FIG. 3 is a perspective view illustrating a first stage of a vehicle high-voltage unit assembling process.

In FIGS. 3 to 8, a process of assembling the vehicle high-voltage unit 9 according to the embodiment is illustrated. As illustrated in FIG. 3, the motor mount 28A is disposed on one end of the rotating electrical machine unit 22 in the width direction and the motor mount 28B is disposed on the other end of the rotating electrical machine unit 22 in the width direction. The fastening holes 53F to 53I of the motor mount 28A are positionally aligned with the fastening holes 23F to 23I provided in an upper end portion of the transmission TA of the rotating electrical machine unit 22, which is an end portion in the width direction, and bolts 92 are screwed into the fastening holes 23F to 23I and the fastening holes 53F to 53I. In this manner, the motor mount 28A is fastened to the rotating electrical machine unit 22.

Similarly, the fastening holes 53A to 53E of the motor mount 28B are positionally aligned with the fastening holes 23A to 23E provided in an upper end portion of the rotating electrical machine MG of the rotating electrical machine unit 22, which is an end portion in the width direction, and the bolts 92 are screwed into the fastening holes 23A to 23E and the fastening holes 53A to 53E. In this manner, the motor mount 28B is fastened to the rotating electrical machine unit 22.

As illustrated in FIG. 4, the rotating electrical machine unit 22 is attached to the MC cross-member 20 via the motor mounts 28A, 28B. The fastening holes 83G, 83L formed in the front and rear ends of the member side fastening portion 54A of the motor mount 28A are positionally aligned with the fastening holes 21G, 21L of the MC cross-member 20, the bolts 92 are screwed into the fastening holes 21G, 21L and the fastening holes 83G, 83L, and tip ends of the bolts 92 are held by nuts 88.

Similarly, the stud bolts 86A, 86S formed in the front and rear ends of the member side fastening portion 54B of the motor mount 28B are inserted into the fastening holes 21A, 21S of the MC cross-member 20 and tip ends of the stud bolts 86A, 86S are held by the nuts 88. Accordingly, the fastening holes 83R, 83T of the member side fastening portion 54B and the fastening holes 21R, 21T of the MC cross-member 20 are positionally aligned with each other. The bolts 92 are screwed into the fastening holes 21R, 21T and the fastening holes 83R, 83T.

Figure 5:
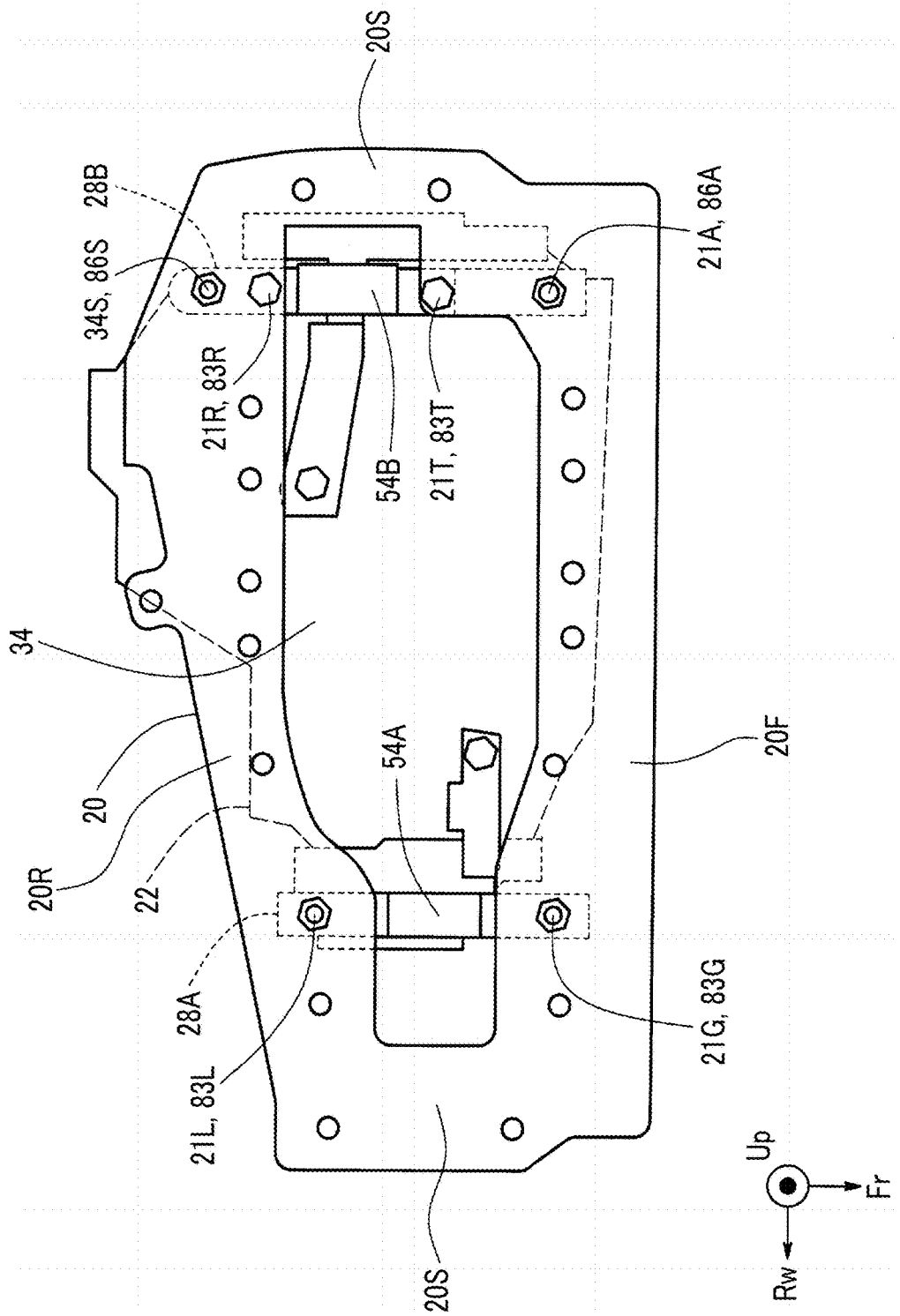
FIG. 5 is a perspective view illustrating a third stage of the vehicle high-voltage unit assembling process.

FIG. 5 illustrates a plan view of an assembly configured with the rotating electrical machine unit 22, the MC cross-member 20, and the motor mounts 28A, 28B. A front end portion (end portion close to positive side of Fr axis) of the MC cross-member 20 projects forward further than a front end portion of the rotating electrical machine unit 22 and at the time of a frontal collision, a collision load is applied to the MC cross-member 20 before a collision load is applied to the rotating electrical machine unit 22.

The member side fastening portions 54A, 54B of the motor mounts 28A, 28B are fastened to the MC cross-member 20 with the member side fastening portions 54A, 54B straddling the opening portion 34 of the MC cross-member 20 in the front-rear direction. In other words, the member side fastening portions 54A, 54B of the motor mounts 28A, 28B are suspended between the front cross portion 20F and the rear cross portion 20R. Since the structure as described above is adopted, the motor mounts 28A, 28B function as reinforcing members for the MC cross-member 20. That is, at the time of a frontal collision, a compressive stress is generated on the motor mounts 28A, 28B (motor mounts 28A, 28B are stretched), and thus the opening portion 34 of the MC cross-member 20 is restrained from being crushed.

Figure 6:
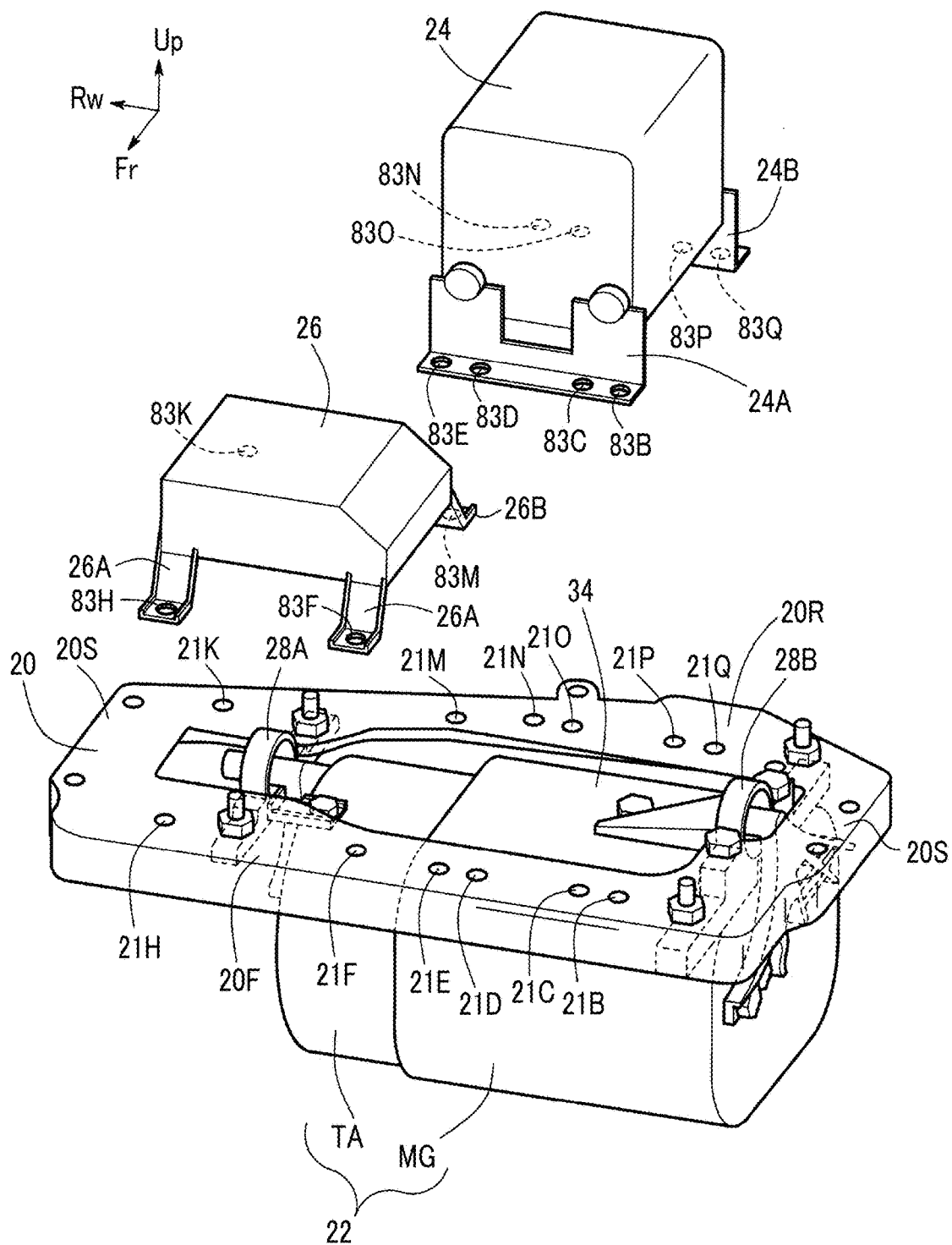
FIG. 6 is a perspective view illustrating a fourth stage of the vehicle high-voltage unit assembling process.

In FIGS. 6 and 7, a process of attaching the PCU 24 and the charger 26 to the MC cross-member 20 is illustrated. The fastening holes 83B to 83E and 83N to 83Q of the leg portions 24A, 24B of the PCU 24 are positionally aligned with the fastening holes 21B to 21E and 21N to 21Q of the MC cross-member 20. Bolts (not shown) are inserted into the fastening holes 21B to 21E and 21N to 21Q and the fastening holes 83B to 83E and 83N to 83Q. In this manner, the PCU 24 is fastened to the MC cross-member 20. When the PCU 24 is fastened to the MC cross-member 20, the high-voltage cable 19 (refer to FIG. 7) is routed in the opening portion 34 of the MC cross-member 20 such that the PCU 24 and the rotating electrical machine MG are electrically connected to each other.

The fastening holes 83F, 83H, 83K, 83M of the leg portions 26A, 26B of the charger 26 are positionally aligned with the fastening holes 21F, 21H, 21K, 21M of the MC cross-member 20. Bolts (not shown) are inserted into the fastening holes 21F, 21H, 21K, 21M and the fastening holes 83F, 83H, 83K, 83M. In this manner, the charger 26 is fastened to the MC cross-member 20.

The vehicle high-voltage unit 9 is configured with the rotating electrical machine unit 22, the PCU 24, and the charger 26 attached to the MC cross-member 20. As illustrated in FIG. 7, the front end portion (end portion close to positive side of Fr axis) of the MC cross-member 20 projects forward further than front end portions of the PCU 24 and the charger 26 and at the time of a frontal collision, a collision load is applied to the MC cross-member 20 before the collision load is applied to the rotating electrical machine unit 22, the PCU 24, and the charger 26.

Figure 8:
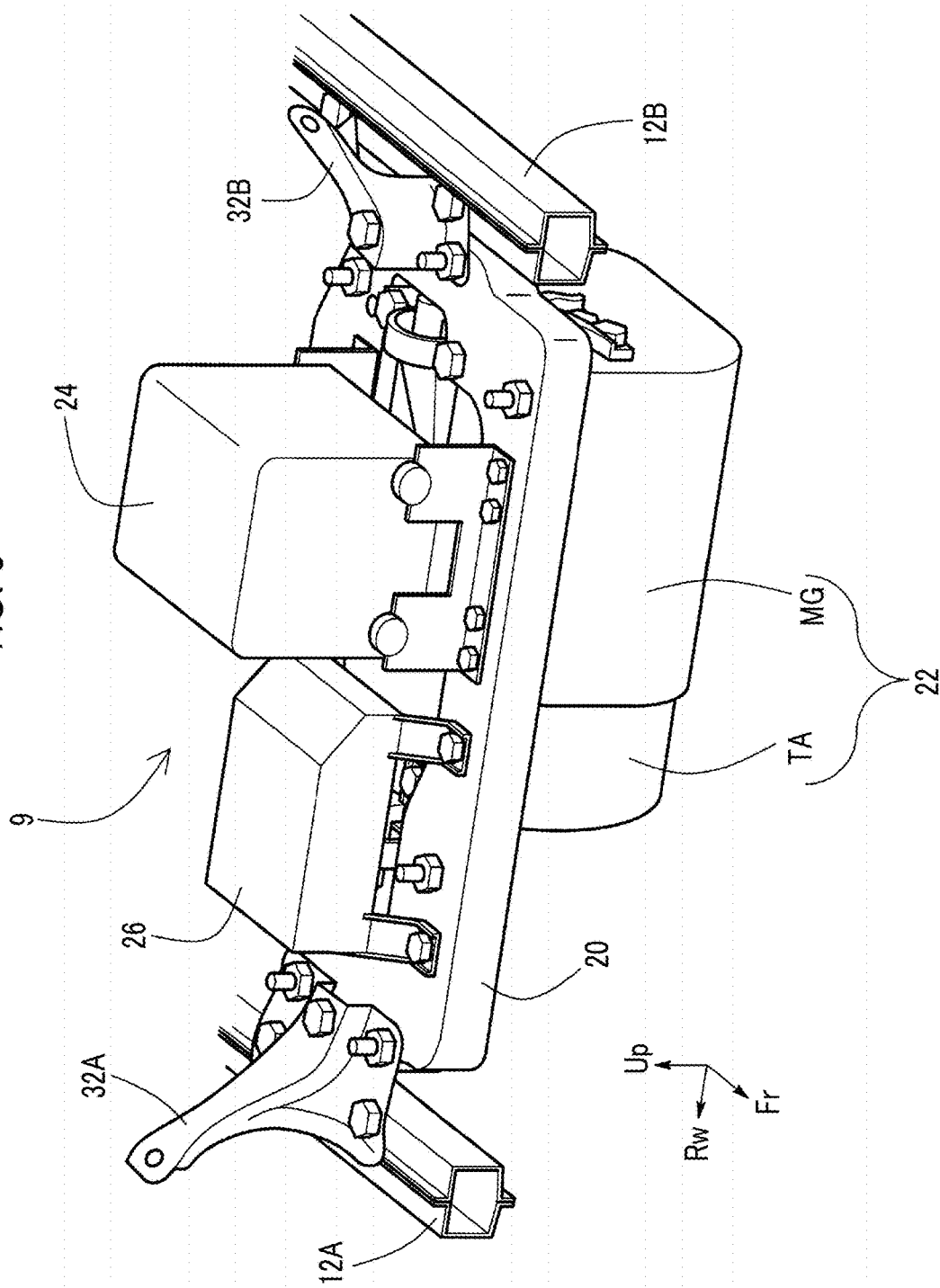
FIG. 8 is a perspective view illustrating a sixth stage of the vehicle high-voltage unit assembling process.

FIGS. 7 and 8 illustrate an example of a step of fastening the vehicle high-voltage unit 9 to the front side members 12A, 12B via the supporting brackets 32A, 32B. The supporting bracket 32A is provided with fastening holes 74A, 74C that are positionally aligned with fastening holes 15A, 15B of the front side member 12A and are bolted to the fastening holes 15A, 15B, and fastening holes 74B, 74D that are positionally aligned with the fastening holes 21I, 21J of the MC cross-member 20 and are bolted to the fastening holes 21I, 21J, the fastening holes 74B, 74D being disposed inward of the fastening holes 74A, 74C in the vehicle width direction.

Similarly, the supporting bracket 32B is provided with fastening holes 74F, 74H that are positionally aligned with fastening holes 15C, 15D of the front side member 12B and are bolted to the fastening holes 15C, 15D and fastening holes 74G 74E that are positionally aligned with the fastening holes 21U, 21V of the MC cross-member 20 and are bolted to the fastening holes 21U, 21V, the fastening holes 74G 74E being disposed inward of the fastening holes 74F, 74H in the vehicle width direction.

At the time of assembly, the supporting brackets 32A, 32B are fastened to the front side members 12A, 12B in advance. The vehicle high-voltage unit 9 is lifted up in the above-described state and the vehicle high-voltage unit 9 is fastened to the supporting brackets 32A, 32B as illustrated in FIG. 8. In this manner, the vehicle high-voltage unit 9 is fastened to the front side members 12A, 12B via the supporting brackets 32A, 32B.

Behavior at Time of Frontal Collision

Figure 9:
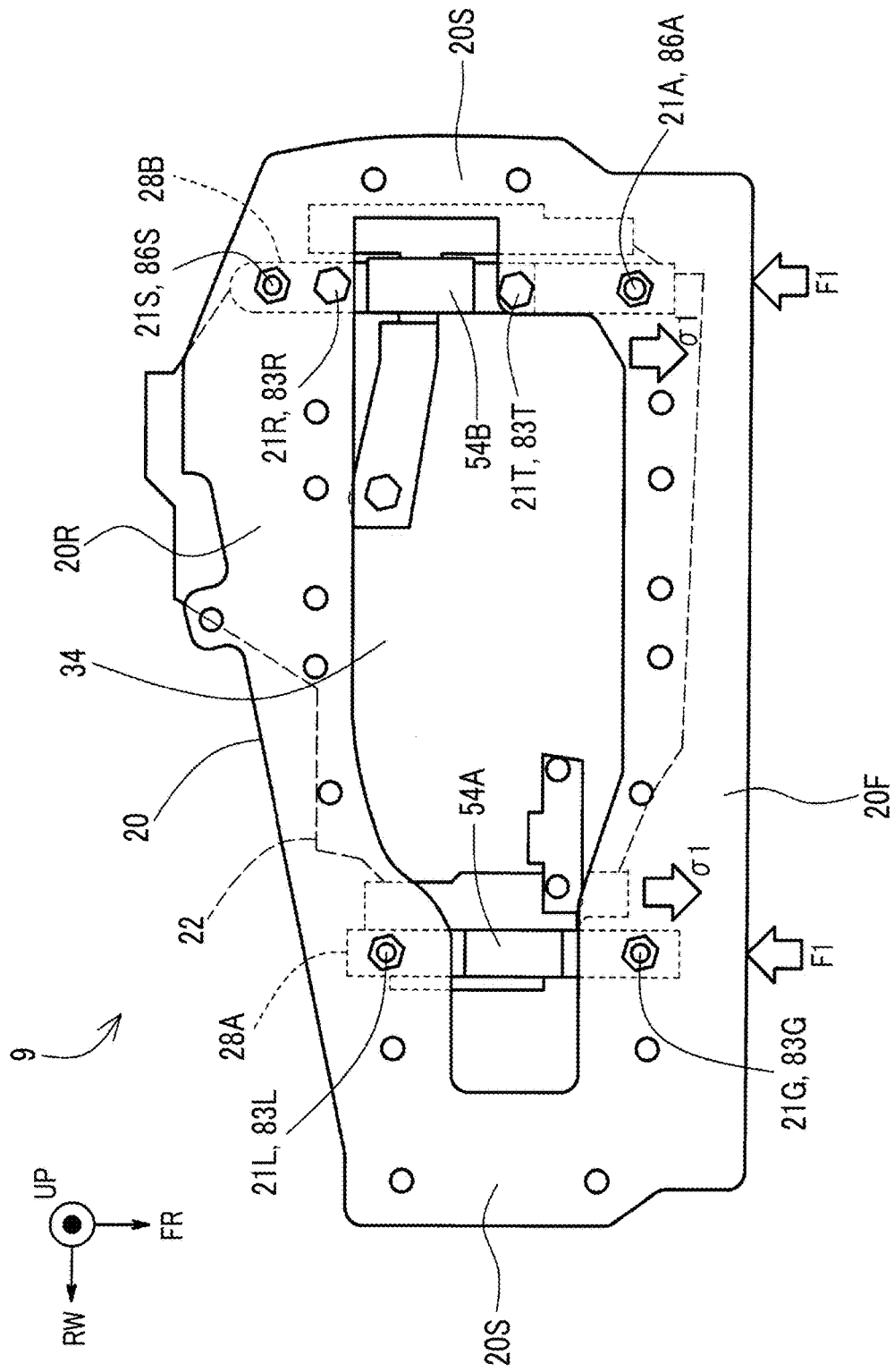
FIG. 9 is a plan view for describing behaviors of an MC cross-member and the motor mounts at the time of a frontal collision.
Figure 10:
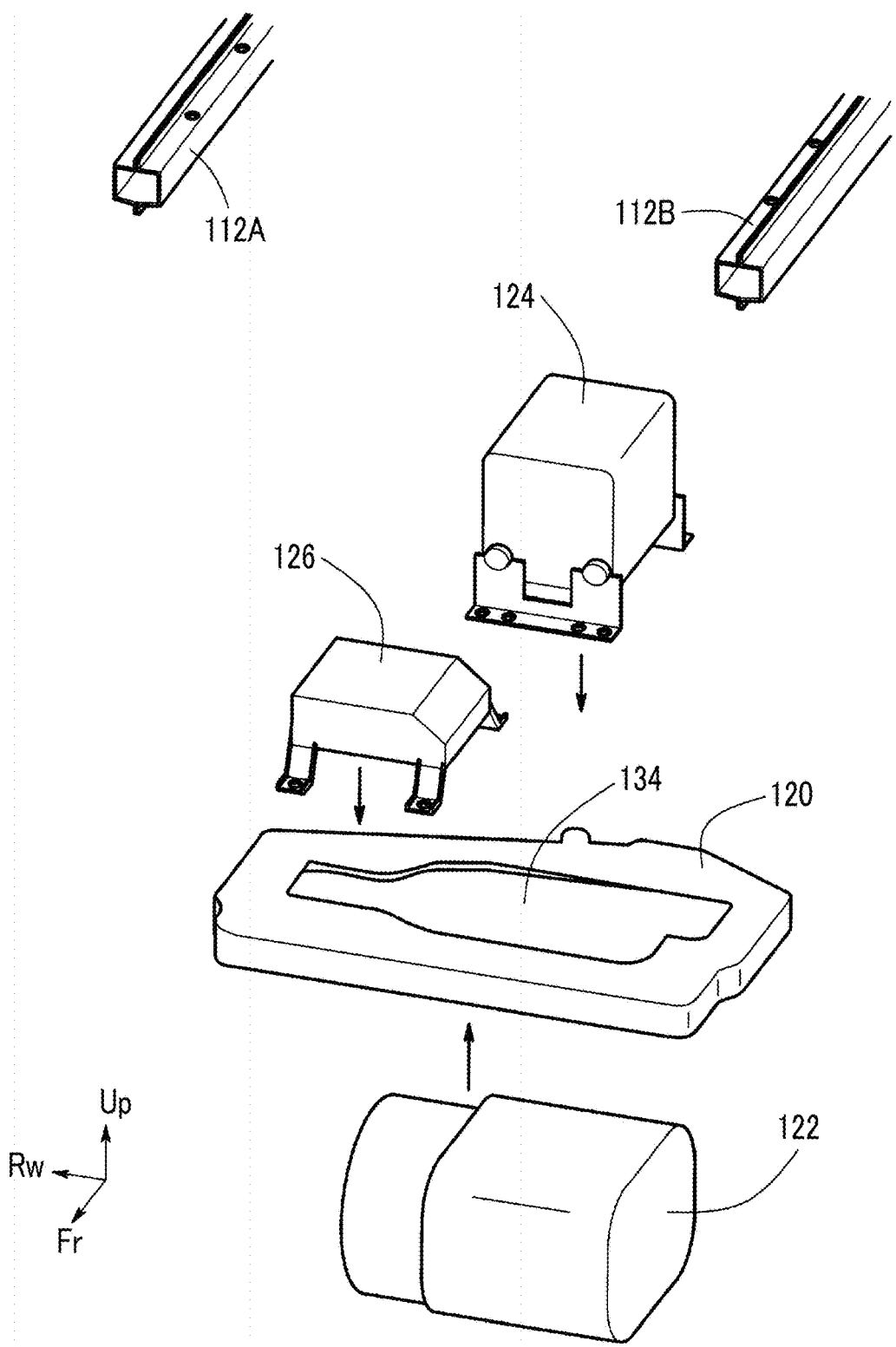
FIG. 10 is an exploded perspective view illustrating members constituting a vehicle high-voltage unit according to the related art.

FIG. 9 illustrates a plan view of the vehicle high-voltage unit 9. For the sake of convenience, the PCU 24 and the charger 26 are not shown in FIG. 9. At the time of a frontal collision of the vehicle, a collision load F1 toward a vehicle rear side is applied to the MC cross-member 20. In this case, a compressive load in the vehicle front-rear direction is applied to the member side fastening portion 54A of the motor mount 28A via the bolts screwed into the fastening holes 83G, 83L. Therefore, a compressive stress $\sigma 1$ is generated on the member side fastening portion 54A.

Similarly, when the collision load F1 is applied to the MC cross-member 20, a compressive load in the vehicle front-rear direction is applied to the member side fastening portion 54B of the motor mount 28B via stud bolts 86A, 86S or the bolts screwed into the fastening holes 83R, 83T. Therefore, the compressive stress σ1 is generated on the member side fastening portion 54B.

The compressive stress generated from the motor mounts 28A, 28B acts such that the motor mounts 28A, 28B are stretched against the collision load. As a result, deformation of the MC cross-member 20 is suppressed. As described above, when the motor mounts 28A, 28B are fastened in the front-rear direction with the motor mounts 28A, 28B straddling the opening portion 34, the rigidity of the MC cross-member 20 in the front-rear direction is improved and deformation at the time of a frontal collision is suppressed. Since a so-called torsional rigidity is improved, vibration of the MC cross-member 20 at the time of normal driving and generation of noise caused by the vibration are suppressed.

Figure 11:
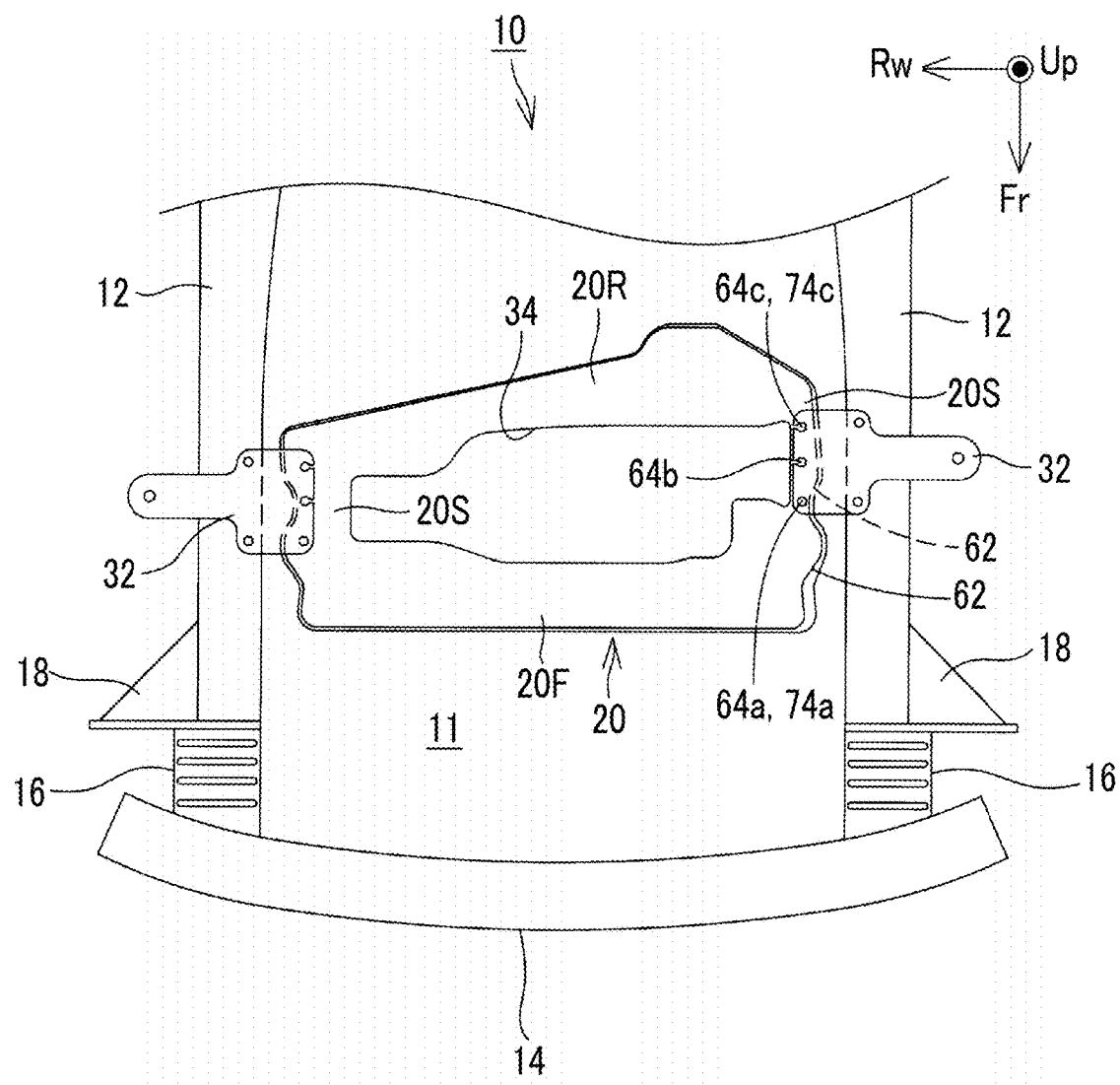
FIG. 11 is a schematic view illustrating a vehicle front portion structure.
Figure 12:
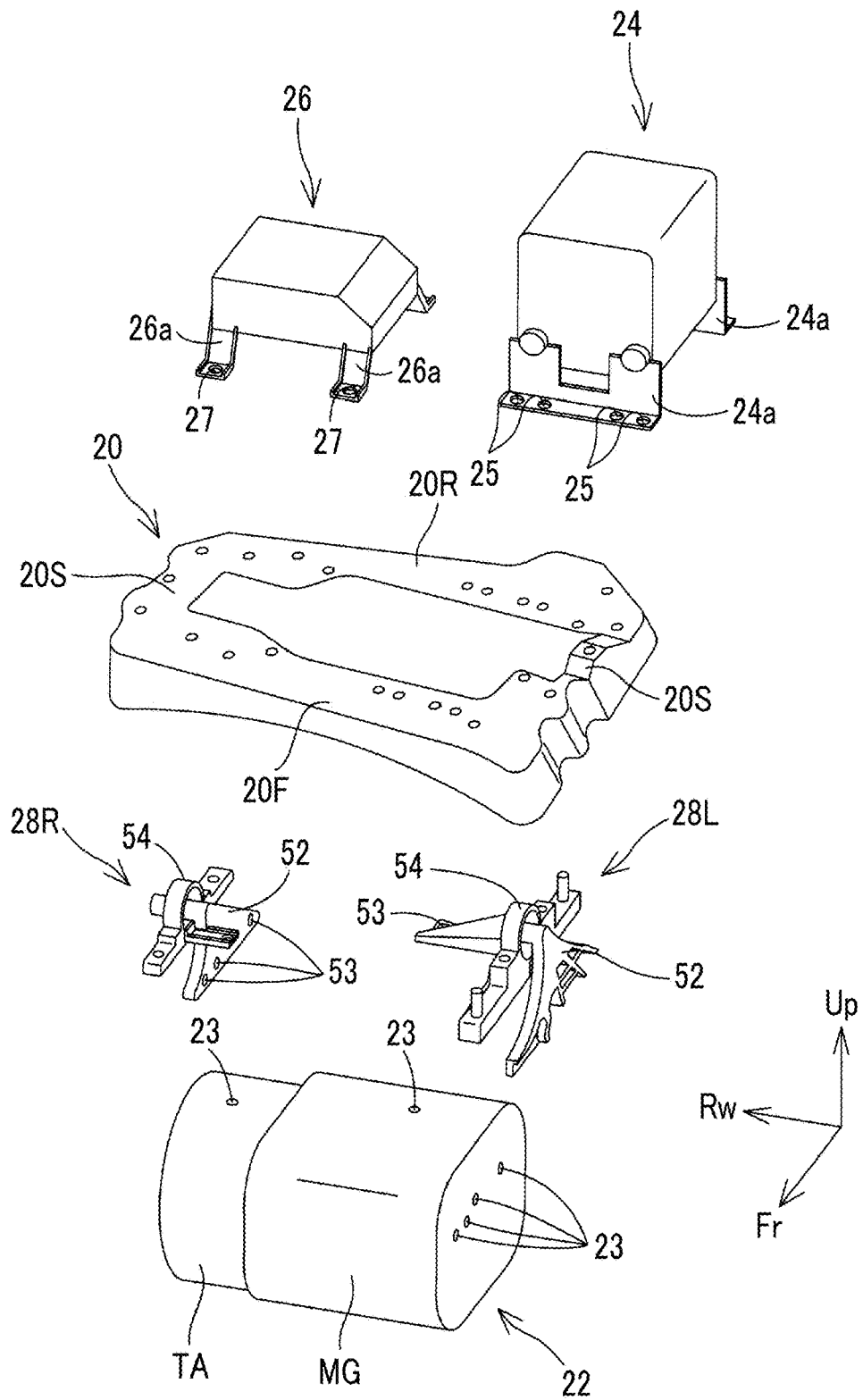
FIG. 12 is an exploded perspective view illustrating the vicinity of the MC cross-member.

Another supporting structure for the vehicle high-voltage unit and a vehicle front portion structure including the other supporting structure for the vehicle high-voltage unit will be described. FIG. 11 is a schematic plan view of a vehicle front portion structure 10. FIG. 12 is an exploded perspective view of the vicinity of the MC cross-member 20.

The entire configuration of the vehicle front portion structure 10 will be simply described. The vehicle front portion structure 10 is installed in an electric vehicle (for example, electric automobile or fuel-cell automobile) that travels using power generated by the rotating electrical machine MG. A vehicle front portion is provided with a power unit chamber 11 in which a power unit is installed. The power unit is a unit that generates traveling power of the vehicle and in the present example, the rotating electrical machine unit 22 (which will be described later) functions as the power unit.

A front end of the power unit chamber 11 is provided with a bumper reinforcement (hereinafter, referred to as "bumper RF") 14 that extends in the vehicle width direction. The bumper RF 14 is curved in plan view such that the bumper RF 14 protrudes toward the vehicle front side. A front side member 12 is connected to the vicinity of each of opposite ends of the bumper RF 14 in the vehicle width direction via a crash box 16. The crash box 16 is compressed and deformed in the vehicle front-rear direction to absorb collision energy generated at the time of collision of the vehicle. Therefore, the crash box 16 usually has a shape of which an outer peripheral surface is formed with a plurality of recess beads such that the crash box 16 is easily compressed and deformed in the vehicle front-rear direction.

The front side member 12 is connected to a rear portion of the crash box 16. The front side member 12 is a skeleton member extending in the vehicle front-rear direction. As illustrated in FIG. 11, two front side members 12 are disposed to be parallel to each other with a sufficient interval provided therebetween in the vehicle width direction. A stress concentration zone, to which stress is concentrated when a load is applied to a side surface of the front side member 12, is set for the front side member 12. The stress concentration zone will be described later.

A gusset 18 is attached to each of outer surfaces the front side members 12 in the vehicle width direction. The gusset 18 is an approximately triangular member, of which a dimension in the vehicle width direction becomes smaller toward the vehicle rear side, in plan view. A front end of the gusset 18 is substantially the same as a front end of the front side member 12. The gusset 18 projects outward in the vehicle width direction further than the front side member 12 and receives an input load at a position outward of the front side member 12 in the vehicle width direction.

The MC cross-member 20 is provided between the front side members 12. The MC cross-member 20 is connected to the front side members 12 via supporting brackets as with the above-described example. In other words, the MC cross-member 20 is suspended between the front side members 12. However, the MC cross-member 20 is not in contact with the front side members 12 and the front side members 12 and the MC cross-member 20 face each other while being separated from each other in the vehicle width direction. In other words, slight gaps are present between the MC cross-member 20 and the front side members 12. The gaps are for allowing the front side members 12 to be bent and the gaps will be described later.

As illustrated in FIG. 12, the charger 26 and the PCU 24 are mounted and fastened onto an upper surface of the MC cross-member 20. The rotating electrical machine unit 22 is hung and held below the MC cross-member 20 via a right motor mount 28R and a left motor mount 28L (hereinafter, both will be referred to as "motor mount 28" omitting suffixes "R" and "L" when right motor mount and left motor mount are not distinguished). The rotating electrical machine unit 22 is provided with the rotating electrical machine MG which is a drive source of the vehicle and the transmission TA (transaxle) as with the above-described example. An upper surface of the rotating electrical machine unit 22 and opposite end surfaces of the rotating electrical machine unit 22 in the width direction are provided with a plurality of fastening holes 23. When the fastening holes 23 and fastening holes 53 of the motor mount 28 are positionally aligned with each other and bolted together, the motor mount 28 is fastened to the rotating electrical machine unit 22.

The motor mount 28 is provided with an MG side fastening portion 52 that is fastened to the rotating electrical machine unit 22 and a member side fastening portion 54 that is fastened to the MC cross-member 20. Details of the way in which the motor mount 28, the rotating electrical machine unit 22, and the MC cross-member 20 are fastened to each other will be described later. The motor mount 28 and the MC cross-member 20 constitute a supporting structure supporting the vehicle high-voltage unit (rotating electrical machine unit 22, PCU 24, and charger 26).

The PCU 24 is fastened to the upper surface of the MC cross-member 20 via fastening bolts (not shown) inserted into a plurality of fastening holes 25 as with the above-described example. The charger 26 is also fastened to the upper surface of the MC cross-member 20 via fastening bolts (not shown) inserted into a plurality of fastening holes 27 as with the above-described example.

A high-voltage cable (not shown) for power transfer is routed between the rotating electrical machine unit 22, the PCU 24, the charger 26, and the battery (not shown). A portion of the high-voltage cable passes through the opening portion 34 provided in the center of the MC cross-member 20.

A case where a frontal collision of a vehicle including the vehicle front portion structure 10 occurs will be simply described. Examples of the frontal collision includes a full-wrap collision in which substantially the entire width of a vehicle front portion collides with a collision object, a small overlap collision in which an end portion of the vehicle front portion (for example, 25% of outer side of vehicle front portion) collides with a collision object, and an oblique collision in which a vehicle collides with a collision object approaching the vehicle from a position diagonally ahead of the vehicle at a high speed.

At the time of the full-wrap collision, a collision load is input to the right and left crash boxes 16 via the bumper RF 14. When the crash boxes 16 receive the collision load, the crash boxes 16 are compressed and deformed and a portion of the collision load is absorbed. The remainder of the collision load that is not absorbed by the crash boxes 16 is transmitted to the right and left front side members 12. The front side members 12 are bent or deformed as needed to absorb or disperse a load. In the above-described process, the bumper RF 14 moving rearward or another member interposed between the bumper RF 14 and the MC cross-member 20 may reach a front end of the MC cross-member 20 such that a load in a direction toward the vehicle rear side is also applied to the MC cross-member 20. In order to suppress deformation of the MC cross-member 20 that is caused by the rearward load, in the present example, the motor mounts 28 crossing over the opening portion 34 in the vehicle front-rear direction are attached to the MC cross-member 20, which will be described later.

Figure 13:
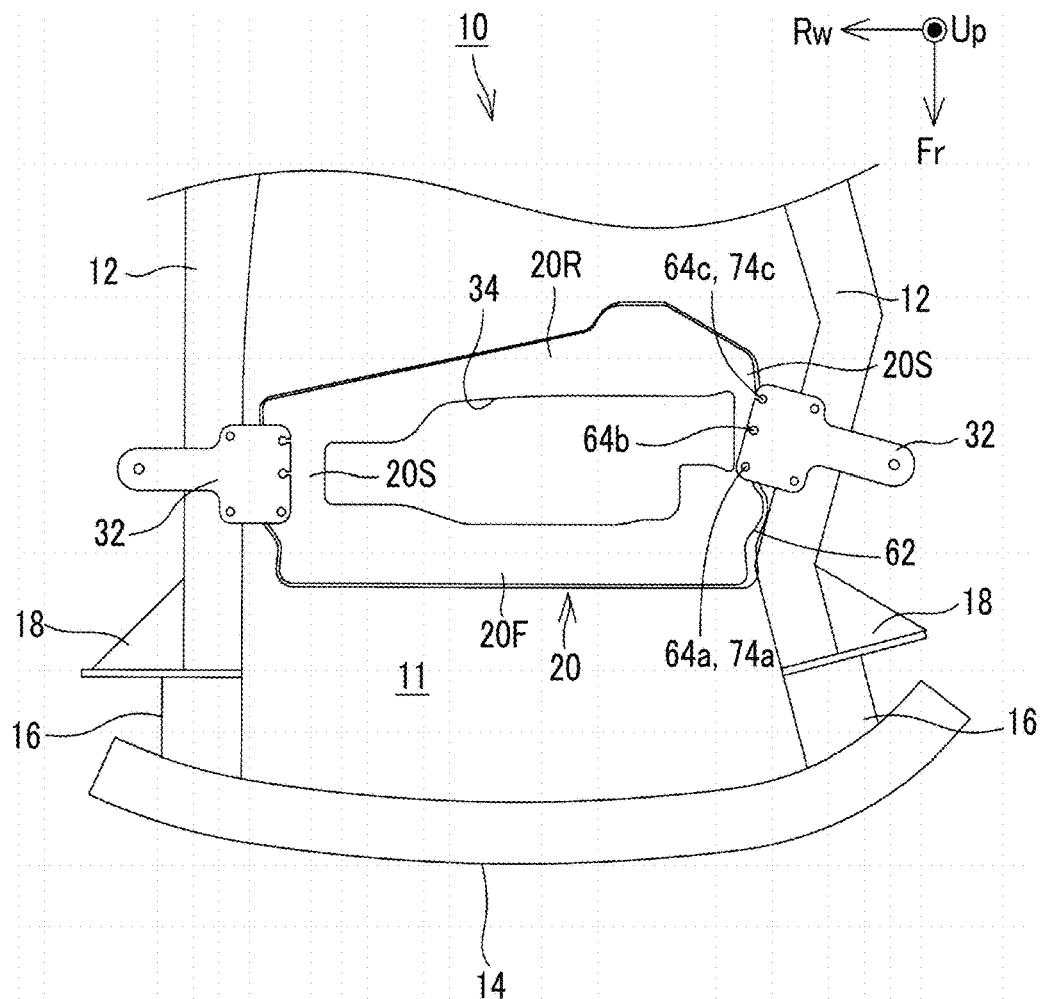
FIG. 13 is a view illustrating a state after a small overlap collision or an oblique collision.

A case where the minute wrap-collision or the oblique collision occurs will be described with reference to FIG. 13. In this case, the collision object collides with the vehicle at a position outward of the front side member 12 in the vehicle width direction. Therefore, in this case, a collision load is applied to the gusset 18 via the bumper RF 14 or is directly applied to the gusset 18 not via the bumper RF 14. The collision load applied to the gusset 18 is transmitted to an outer surface of the front side member 12 via the gusset 18. When the front side member 12 receives the collision load, the front side member 12 is bent inward and becomes curved inward in the vehicle width direction at a position near a rear end of the gusset 18, as illustrated in FIG. 13. Accordingly, the front side member 12 abuts onto a side surface of the MC cross-member 20 and the collision load is transmitted to the MC cross-member 20. When the MC cross-member 20 receives the collision load, the MC cross-member 20 moves in the vehicle width direction and abuts onto the front side member 12 on the opposite side (in FIG. 13, right side of vehicle).

That is, a collision load at the time of the minute wrap-collision or the oblique collision is transmitted to the gusset 18 on one side, the front side member 12 on the one side, the MC cross-member 20, and the front side member 12 on the opposite side in this order. The collision load is absorbed or dispersed in the process of transmission. Since the collision load is finally transmitted to the front side member 12 on the opposite side, the entire vehicle easily moves in a direction away from the collision load. Therefore, it is possible to reduce deformation or damage of each portion of the vehicle that is caused by the collision load.

As is apparent from the above description, it is desired that the MC cross-member 20 is not deformed at the time of the full-wrap collision and it is desired that the collision load is efficiently transmitted to the MC cross-member 20 from the front side member 12 at the time of the small overlap collision and the oblique collision. In the present example, each component is configured such that the above-described desires are satisfied. Hereinafter, the configuration of each component will be described in more detail.

Figure 14:
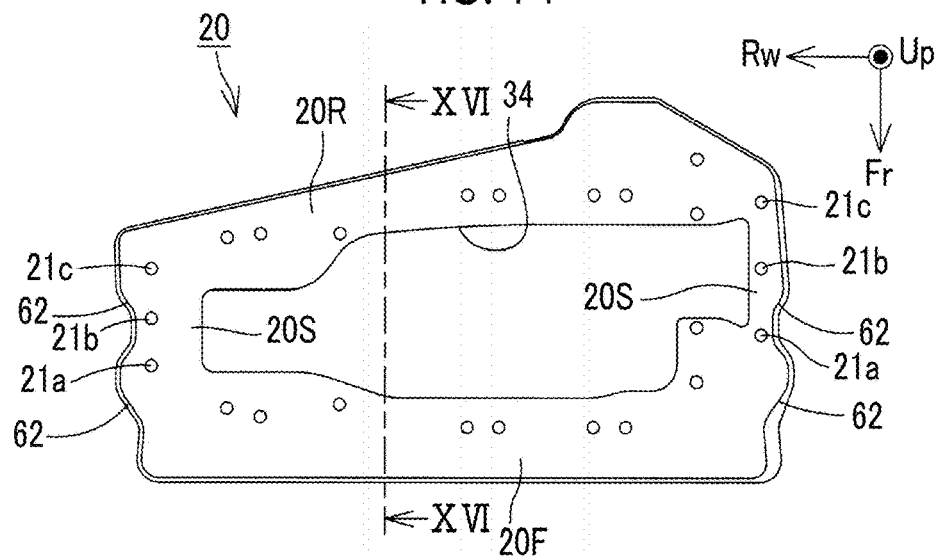
FIG. 14 is a plan view of the MC cross-member.
Figure 15:
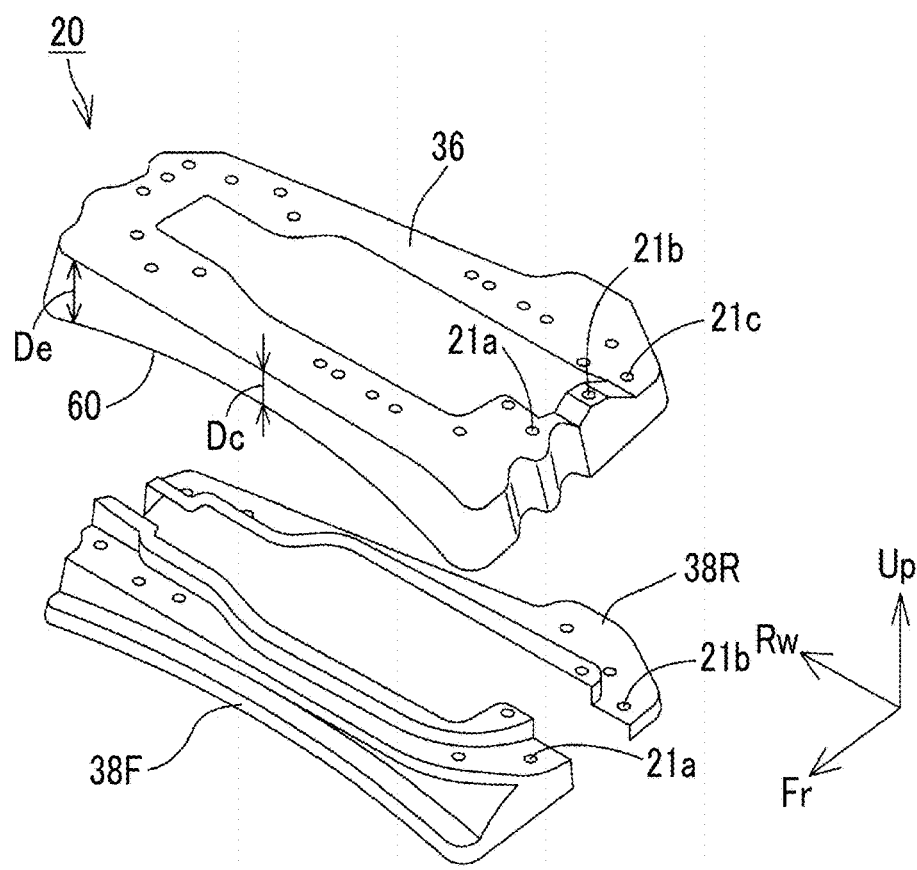
FIG. 15 is an exploded perspective view of the MC cross-member.
Figure 16:
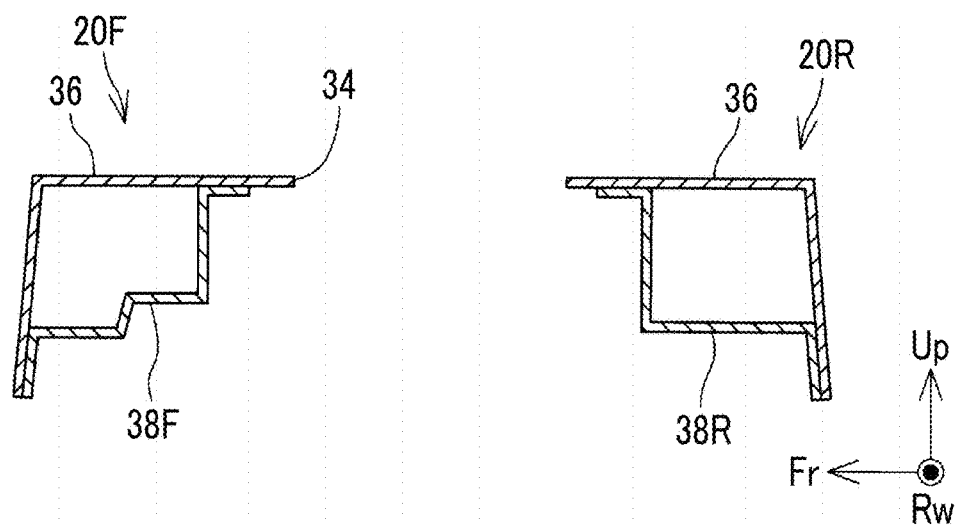
FIG. 16 is an end view taken along the line XVI-XVI in FIG. 14.

The configuration of the MC cross-member 20 will be described with reference to FIGS. 14 to 16. FIG. 14 is a plan view of the MC cross-member 20 and FIG. 15 is an exploded perspective view of the MC cross-member 20. FIG. 16 is an end view taken along the line XVI-XVI in FIG. 14.

As described above, the MC cross-member 20 is a member that is suspended between the front side members 12, on which the PCU 24 and the charger 26 are mounted, and that holds the rotating electrical machine unit 22 such that the rotating electrical machine unit 22 is hung from the MC cross-member 20. As illustrated in FIG. 14, the MC cross-member 20 has an approximately rectangular shape that is elongated in the vehicle width direction in plan view. The opening portion 34 that is elongated in the vehicle width direction is formed in the center of the MC cross-member 20 and the MC cross-member 20 has an approximately rectangular shape as a whole. In the opening portion 34, a portion of the high-voltage cable connected to the rotating electrical machine unit 22, the PCU 24, and the charger 26 is routed.

As illustrated in FIG. 15, the MC cross-member 20 is configured by combining one upper member 36 and two lower members 38F, 38R. The upper member 36 is provided with an upper surface formed with a large central opening and a peripheral surface that hangs down from a peripheral edge of the upper surface and the entire bottom surface of the upper member 36 is open. The front lower member 38F and the rear lower member 38R are members attached to a lower side of the upper member 36 and a number of stepped portions are formed on the front lower member 38F and the rear lower member 38R. Hereinafter, in a case where the front lower member and the rear lower member are not distinguished, both of the front lower member 38F and the rear lower member 38R will be simply referred to as "lower member 38" omitting suffixes "F" and "R".

As illustrated in FIG. 16, the front lower member 38F forms a closed section between the upper member 36 and the front lower member 38F and the rear lower member 38R forms a closed section between the upper member 36 and the rear lower member 38R. That is, an uppermost surface and a front end surface of the front lower member 38F are close to or in contact with the upper member 36 but portions of the front lower member 38F other than the uppermost surface and the front end surface are sufficiently separated from the upper member 36. Similarly, an uppermost surface and a front end surface of the rear lower member 38R are close to or in contact with the upper member 36 but portions of the rear lower member 38R other than the uppermost surface and the front end surface are sufficiently separated from the upper member 36.

Since the MC cross-member 20 has a hollow shape formed by the upper member 36 and the lower members 38, it is possible to greatly improve the strength of the MC cross-member 20 in comparison with a case where the MC cross-member 20 is configured with one plate member. Particularly, when the above-described configuration is adopted, compression and deformation of the MC cross-member 20 in the vehicle width direction are effectively suppressed. That is, the MC cross-member 20 is not likely to be compressed and deformed even when the front side member 12 receives a collision load in the vehicle width direction at the time of the small overlap collision or the oblique collision. As a result, the collision load can be more reliably transmitted to the front side member 12 on the opposite side. Although the upper member 36 and the lower members 38 illustrated in FIG. 15 have a simple shape without a bead and a recess portion, the upper member 36 and the lower members 38 may be provided with a plurality of beads or a plurality of recess portions. It is possible to further improve the strength of the MC cross-member 20 by appropriately providing a bead or a recess portion.

When seeing from another point of view, the MC cross-member 20 can be classified into the front cross portion 20F that extends in the vehicle width direction, the rear cross portion 20R that extends in the vehicle width direction behind the front cross portion 20F, and the side portions 20S that connect right and left ends of the front cross portion 20F to right and left ends of the rear cross portion 20R. At the time of the small overlap collision or the oblique collision, the side portion 20S functions as a collision load input portion and a collision load output portion. That is, the collision load is input to the side portion 20S on one side via the gusset 18 on the one side and the front side member 12 on the one side. The collision load input to the side portion 20S on the one side is transmitted to the side portion 20S on the opposite side via the front cross portion 20F and the rear cross portion 20R and is output to the front side member 12 on the opposite side from the side portion 20S on the opposite side. It is desirable that the area of a surface of the side portion 20S that faces the front side member 12 (outer surface of side portion 20S in vehicle width direction) is as large as possible, the side portion 20S functioning as a load input portion and a load output portion as described above.

In the present example, as illustrated in FIG. 15, a height dimension (thickness) De of an end portion of the MC cross-member 20 in the vehicle width direction is larger than a height dimension Dc of the central portion of the MC cross-member 20 in the vehicle width direction. In order to realize the above-described dimensions, a lower end side 60 of each of a front end surface and a rear end surface of the MC cross-member 20 is formed to have an arc shape curved upward. Accordingly, the bent front side member 12 can more reliably come into contact with the side portion 20S since the outer surface of the side portion 20S in the vehicle width direction is large. The height dimension (thickness) De of an end portion in the vehicle width direction that is on a front side in the vehicle front-rear direction may be larger than that on a rear side in the vehicle front-rear direction. The height dimension De may be larger than the height dimension of the front side member.

In the present example, the outer surface of the side portion 20S is provided with two projecting walls 62. The projecting wall 62 is a portion that projects outward in the vehicle width direction in comparison with a portion of the outer surface that is ahead of the projecting wall 62. The projecting wall 62 can be formed by providing a stepped portion or a recess portion that is curved inward in the vehicle width direction for the side portion 20S. At the time of the small overlap collision or the oblique collision, the bent front side member 12 is caught on the projecting wall 62 such that the front side member 12 is restrained from moving rearward.

That is, at the time of the small overlap collision or the oblique collision, the front side member 12 is curved and the front side member 12 is moved to the vehicle rear side. When the front side member 12 freely moves rearward, the collision load is not likely to be transmitted to the MC cross-member 20. Meanwhile, in a case where the side portion 20S is provided with the projecting wall 62 that projects outward in the vehicle width direction, the bent front side member 12 abuts onto the projecting wall 62 so that the front side member 12 is restrained from moving rearward beyond the projecting wall 62. As a result, the collision load at the time of the small overlap collision or the oblique collision can be more reliably transmitted to the MC cross-member 20.

Here, at the time of the small overlap collision or the oblique collision, the front side member 12 is likely to be bent near the rear end of the gusset 18 or at a position slightly behind the rear end of the gusset 18. Although the position of the projecting wall 62 in the vehicle front-rear direction is not particularly limited, it is desirable that the position of the projecting wall 62 in the vehicle front-rear direction is the same as a position at which the front side member 12 is likely to be bent (rear end of gusset 18 or position slightly behind rear end of gusset 18) or is slightly behind the position at which the front side member 12 is likely to be bent. When the projecting wall 62 is provided at the position as described above, the bent front side member 12 can be more reliably caught on the projecting wall 62.

However, a position at which the front side member 12 is bent depends on the direction in which the collision load is input or the magnitude of the collision load. For example, a position at which the front side member 12 is bent at the time of the small overlap collision and a position at which the front side member 12 is bent at the time of the oblique collision are slightly different from each other. It is desirable that two or more projecting walls 62 are provided on one side portion 20S such that there is no problem even when there is a change in position at which the front side member 12 is bent although the number of projecting walls 62 is not particularly limited.

Meanwhile, it is desirable that the front side member 12 is bent inward in the vehicle width direction at the time of the small overlap collision or the oblique collision although a direction in which the front side member 12 is bent is not particularly limited. However, when the front side member 12 and the MC cross-member 20 are in contact with each other without a gap provided therebetween in the vehicle width direction, the MC cross-member 20 inhibits the front side member 12 from being bent. In the present example, the MC cross-member 20 and the front side member 12 are separated from each other in the vehicle width direction at the same position as a position, at which the front side member 12 is expected to be bent, in the vehicle front-rear direction. Accordingly, a space in which the front side member 12 is bent and deformed can be secured and thus the front side member 12 can be bent more reliably. The position at which the front side member 12 is expected to be bent is the stress concentration zone of the MC cross-member 20 which will be described in detail later and is the rear end of the gusset 18 or a discontinuation position 42 of a reinforcement rib 40 (refer to FIG. 17).

Figure 17:
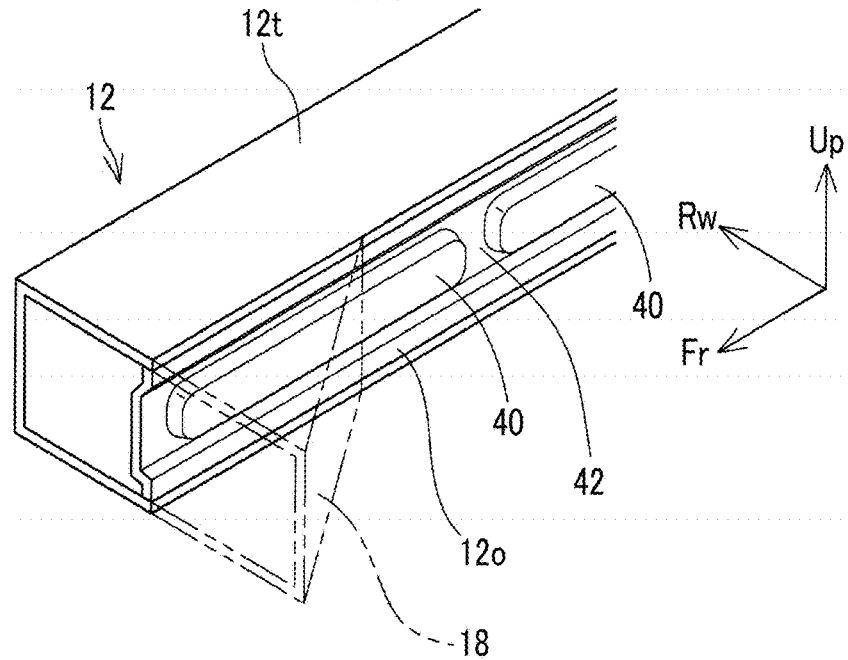
FIG. 17 is a perspective view illustrating the vicinity of a front end of a front side member.

The front side member 12 and the gusset 18 will be described with reference to FIG. 17. FIG. 17 is a perspective view illustrating the vicinity of the front end of the front side member 12. The front side member 12 is a skeleton member extending in the vehicle front-rear direction and is a hollow rectangular pipe-shaped member. A number of stress concentration zones to which a stress is likely to be concentrated and at which the front side member 12 is likely to be bent are set for the front side member 12. One of the stress concentration zones is a position near the rear end of the gusset 18. A load input via the gusset 18 is likely to be concentrated to the position near the rear end of the gusset 18. The front side member 12 is likely to be bent inward in the vehicle width direction at the position near the rear end of the gusset 18. An outer surface 12o of the front side member 12 in the vehicle width direction is provided with the reinforcement rib 40 and the discontinuation position 42 of the reinforcement rib 40 functions as a stress concentration zone. That is, the reinforcement rib 40 is provided to improve the strength of the front side member 12 and is a linear bead elongated in the vehicle front-rear direction. However, the reinforcement rib 40 is not continuous in the vehicle front-rear direction and is discontinuous. The front side member 12 is not likely to be bent at a position where the reinforcement rib 40 is formed. Meanwhile, at the discontinuation position 42 of the reinforcement rib 40, the strength is locally decreased and a stress is likely to be concentrated to the discontinuation position 42. Therefore, the discontinuation position 42 of the reinforcement rib 40 serves as a stress concentration zone to which a stress is likely to be concentrated and at which the front side member 12 is likely to be bent.

In the present example, the discontinuation position 42 of the reinforcement rib 40 is provided behind the rear end of the gusset 18. Therefore, the front side member 12 may be bent at the discontinuation position 42 (position behind the rear end of the gusset 18) of the reinforcement rib 40 although depending on the way in which a stress is input. In this case as well, the front side member 12 and the MC cross-member 20 are separated from each other in the vehicle width direction at the same position as the discontinuation position 42 of the reinforcement rib 40 in the vehicle front-rear direction such that the front side member 12 can be reliably bent. At least one of the projecting walls 62 is provided at the same position as the discontinuation position 42 of the reinforcement rib 40 in the vehicle front-rear direction or is provided behind the discontinuation position 42 of the reinforcement rib 40 in the vehicle front-rear direction. As illustrated by a two-dot chain line in FIG. 17, the gusset 18 is attached to the outer surface 12o of the front side member 12. It is possible to appropriately use the configuration of the gusset 18 in the related art, and thus the details thereof will not be described here.

Figure 18:
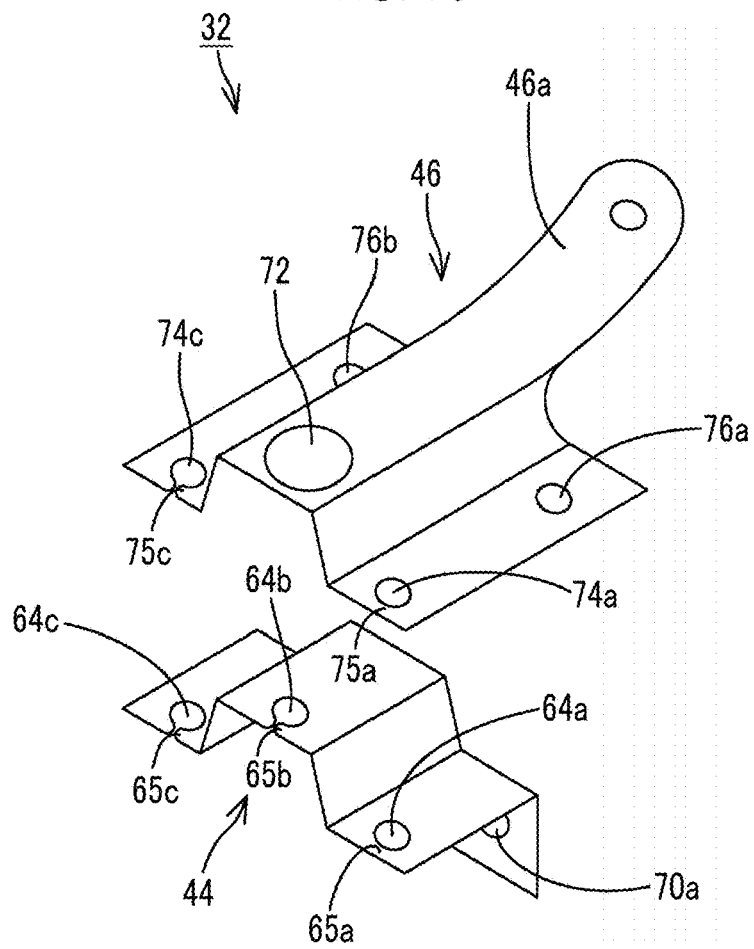
FIG. 18 is an exploded perspective view of a supporting bracket.
Figure 19:
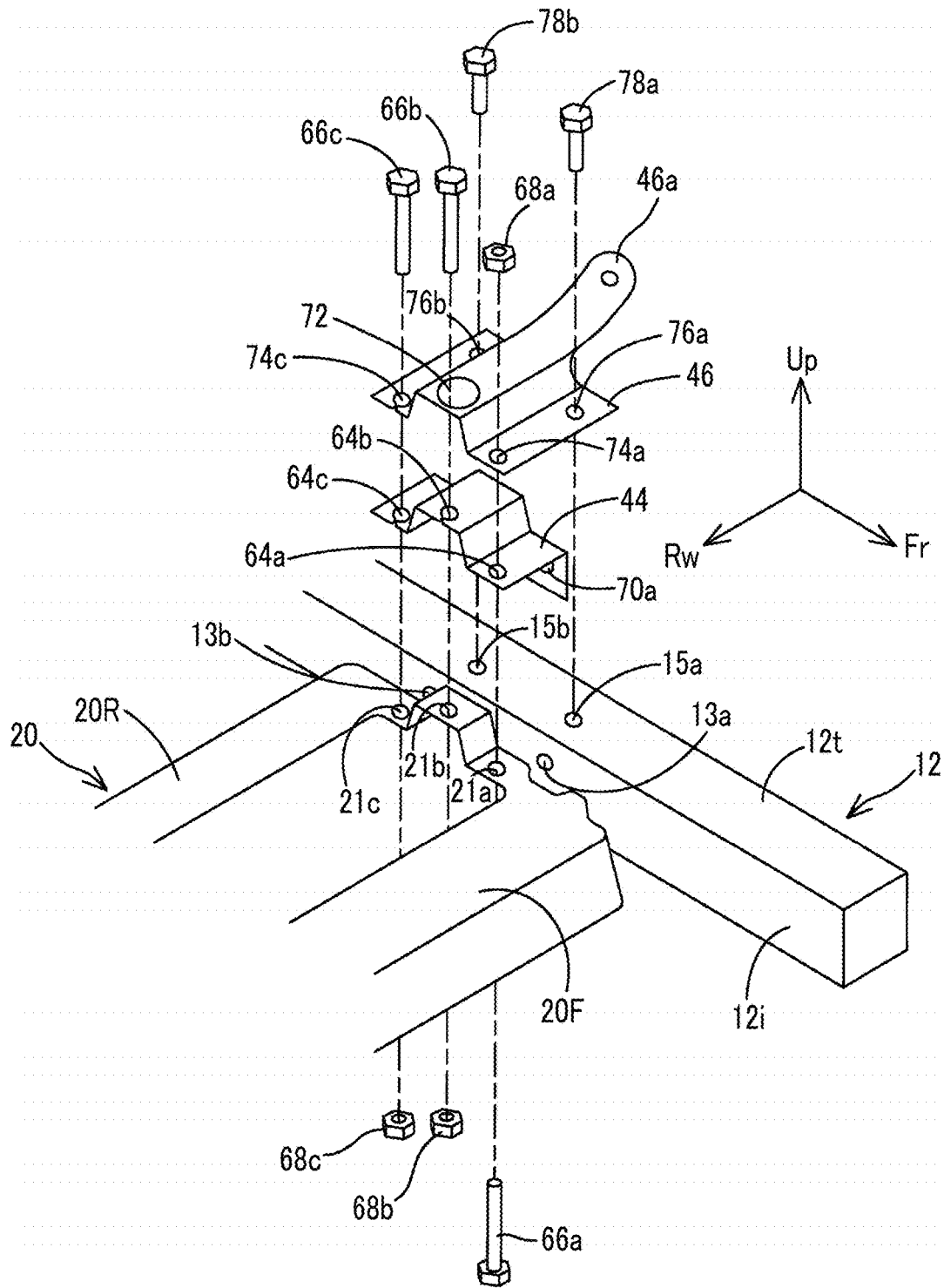
FIG. 19 is a perspective view illustrating the way in which the supporting bracket is attached.

The front side member 12 and the MC cross-member 20 are connected to each other via a supporting bracket. FIG. 18 is an exploded perspective view of the supporting bracket. FIG. 19 is a perspective view illustrating the way in which the supporting bracket is attached. The supporting bracket is provided with two bracket pieces 44, 46. The two bracket pieces 44, 46 are vertically stacked on each other and constitute the supporting bracket. As illustrated in FIGS. 1 and 13, the supporting bracket is attached at a position behind the stress concentration zone (rear end of gusset 18 or discontinuation position 42 of reinforcement rib 40), at which the front side member 12 is expected to be bent, in the vehicle front-rear direction. The supporting bracket connects the front side member 12 and the MC cross-member 20 to each other in a state where the front side member 12 and the MC cross-member 20 are separated from each other in the vehicle width direction.

The first bracket piece 44 connects the upper surface of the MC cross-member 20 and an inner surface 12i of the front side member 12 in the vehicle width direction to each other. Accordingly, the first bracket piece 44 is provided with a surface that extends in an approximately horizontal direction such that the surface becomes parallel to the upper surface of the MC cross-member 20 and a surface that extends in an approximately vertical direction such that the surface becomes parallel to the inner surface 12i of the front side member 12 and the first bracket piece 44 has an approximately L-shape. Three first fastening holes 64a to 64c are formed in a horizontal surface of the first bracket piece 44 such that the first fastening holes 64a to 64c are arranged in the front-rear direction. The first fastening holes 64a to 64c are holes into which first fastening bolts 66a to 66c are inserted and are provided at positions corresponding to the fastening holes 21a to 21c formed in the MC cross-member 20. Two second fastening holes 70a (one second fastening hole is shown in FIGS. 18 and 19) are formed in a vertical surface of the first bracket piece 44 such that the two second fastening holes 70a are arranged in the front-rear direction. The second fastening holes 70a are holes into which second fastening bolts (not shown) are inserted and are provided at positions corresponding to fastening holes 13a, 13b formed in the inner surface of the front side member 12.

The second bracket piece 46 connects the upper surface of the MC cross-member 20 and an upper surface 12t of the front side member 12 to each other. Accordingly, the second bracket piece 46 is provided with a surface that extends in an approximately horizontal direction such that the surface becomes parallel to the upper surface of the MC cross-member 20 and the upper surface 12t of the front side member 12. The second bracket piece 46 is also provided with an extension portion 46a that greatly extends outward such that the second bracket piece 46 can also be fastened to another member (for example, suspension tower).

In the vicinity of an inner end portion of the second bracket piece 46 in the vehicle width direction, one insertion hole 72 and two first fastening holes 74a, 74c are provided. The two first fastening holes 74a, 74c are disposed such that the insertion hole 72 is interposed between the two first fastening holes 74a, 74c in the front-rear direction. The positions of the first fastening holes 74a, 74c and the insertion hole 72 are substantially the same as the positions of the first fastening holes 64a to 64c of the first bracket piece 44. The diameter of the insertion hole 72 is larger than that of the head of each of the first fastening bolts 66a to 66c.

In the vicinity of an outer end portion of the second bracket piece 46 in the vehicle width direction, two third fastening holes 76a, 76b are formed such that the third fastening holes 76a, 76b are arranged in the front-rear direction. The third fastening holes 76a, 76b are provided at positions corresponding to fastening holes 15a, 15b formed in the upper surface 12t of the front side member 12.

When the MC cross-member 20 and the front side member 12 are connected to each other, first, the first bracket piece 44 is screwed and fastened to the inner surface 12i of the front side member 12. Then, the second bracket piece 46 is placed onto the first bracket piece 44 and the second bracket piece 46 is screwed and fastened to the upper surface 12t of the front side member 12. Thereafter, the MC cross-member 20 with the rotating electrical machine unit 22, the PCU 24, and the charger 26 attached thereto is lifted up such that the upper surface of the MC cross-member 20 is disposed below the supporting bracket. In this state, the first and second bracket pieces 44, 46 are screwed and fastened to the MC cross-member 20 by using the first fastening bolts 66a to 66c and nuts 68a to 68c.

Figure 20:
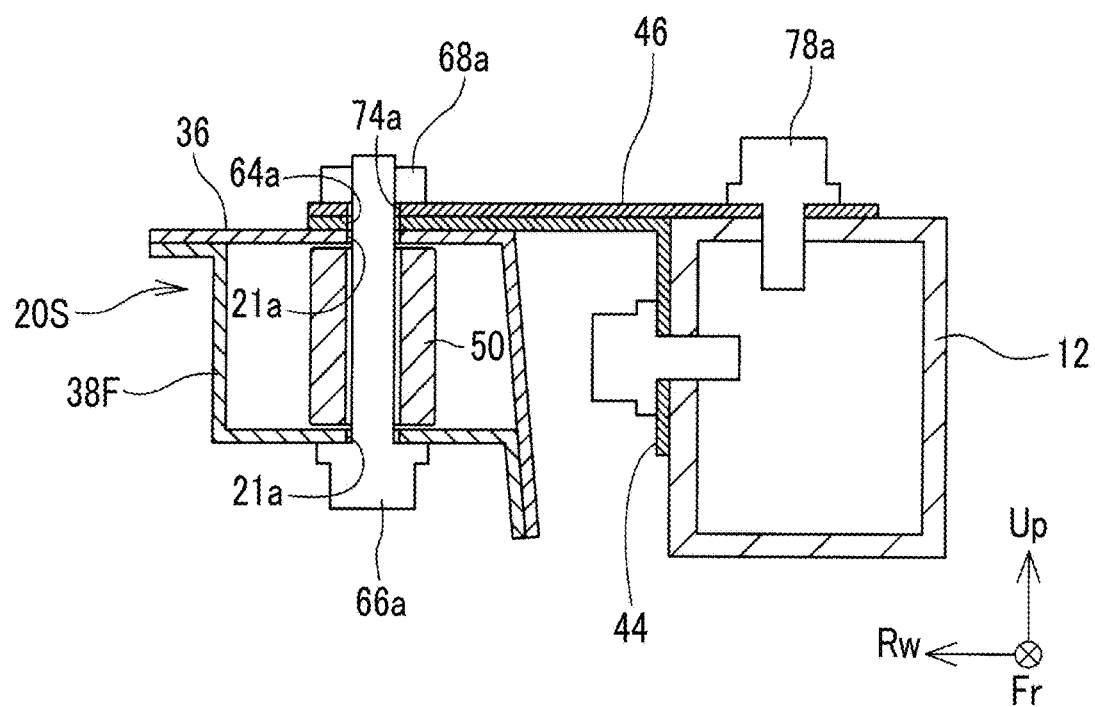
FIG. 20 is a schematic end view taken along a cutting plane line passing through a first fastening bolt.

Here, the front and rear fastening holes 21a, 21c among the three fastening holes 21a to 21c formed in the MC cross-member 20 are formed in both of the upper member 36 and the lower member 38. The first fastening bolts 66a, 66c inserted into the fastening holes 21a, 21c penetrates a closed section of the MC cross-member 20. This will be described with reference to FIG. 20. FIG. 20 is a schematic end view taken along a cutting plane line passing through the first fastening bolt 66a.

As illustrated in FIG. 20, a collar 50 extending in a thickness direction is provided in the MC cross-member 20 (in closed section). The collar 50 is disposed to be coaxial with the fastening holes 21a formed in the upper member 36 and the lower member 38 and the height of the collar 50 is substantially the same as the height of the closed section or is slightly smaller than that of the closed section. When the MC cross-member 20 and the first and second bracket pieces 44, 46 are connected to each other, the first fastening bolt 66a is inserted into the fastening hole 21a of the lower member 38, the collar 50, the fastening hole 21a of the upper member 36, the first fastening hole 64a of the first bracket piece 44, and the first fastening hole 74a of the second bracket piece 46. Then, the nut 68a is screwed onto a male screw protruding from an upper surface of the second bracket piece 46 and is tightened. That is, the lower member 38, the collar 50, the upper member 36, the first bracket piece 44, and the second bracket piece 46 are fastened to each other with the first fastening bolt 66a and the nut 68a. Since the first fastening bolts 66a, 66c penetrate the closed section of the MC cross-member 20 as described above, the attachment rigidity of the first fastening bolts 66a, 66c can be improved. In this case, since the torsional rigidity of the MC cross-member 20 is improved, even when the MC cross-member 20 vibrates due to vibration of a transaxle or the high-voltage component, bending or deformation of the MC cross-member 20 can be effectively suppressed.

Here, gap portions between the first fastening holes 64a to 64c and an inner side end of the first bracket piece 44 in the vehicle width direction and gap portions between the first fastening holes 74a, 74c and an inner side end of the second bracket piece 46 in the vehicle width direction are load bearing portions 65a to 65c, 75a, 75c (refer to FIG. 18) that receive a load from the first fastening bolts 66a to 66c when the first and second bracket pieces 44, 46 are pulled outward in the vehicle width direction. In the present example, the strengths of the load bearing portions 65, 75a that are foremost among the load bearing portions 65a to 65c, 75a, 75c are higher than the strengths of the other load bearing portions 65b, 65c, 75c. Specifically, as is apparent from FIG. 18, each of the central and rear first fastening holes 64a, 64c among the three first fastening holes 64a to 64c provided in the first bracket piece 44 has an approximately C-shape of which an inner circumferential edge in the vehicle width direction is discontinuous. Similarly, the rear first fastening hole 74c among the two first fastening holes 74a, 74c provided in the second bracket piece 46 also has an approximately C-shape of which an inner circumferential edge in the vehicle width direction is discontinuous. Therefore, the strengths of the central and rear load bearing portions 65b, 65c, 75c are significantly lower than that of the front load bearing portions 65a, 75a. Since the above-described configuration is adopted, the first and second bracket pieces 44, 46 are allowed to rotate and move in a case where the front side member 12 is bent.

That is, as described above and as illustrated in FIG. 13, at the time of the small overlap collision or the oblique collision, the front side member 12 is bent inward in the vehicle width direction at a position ahead of the supporting bracket. In order for the supporting bracket to follow the bending of the front side member 12, as illustrated in FIG. 13, the supporting bracket needs to rotate about a vertical axis such that the rear end of the supporting bracket is displaced outward in the vehicle width direction. In this case, when a portion of the supporting bracket in the vicinity of the central first fastening hole 64b and a portion of the supporting bracket in the vicinity of the rear first fastening holes 64c, 74c are firmly connected to the MC cross-member 20, the supporting bracket cannot rotate. In the present example, each of the circumferential edge of the central first fastening hole 64b and the circumferential edges of the rear first fastening holes 64c, 74c has an approximately C-shape which is discontinuous on the inner side in the vehicle width direction. Therefore, when a force that pulls the supporting bracket outward in the vehicle width direction is applied to the supporting bracket, the central and rear load bearing portions 65b, 65c, 75c are easily broken such that the first fastening bolts 66b, 66c are removed from the central and rear first fastening holes 64b, 64c, 74c. Accordingly, the supporting bracket can easily rotate about the front first fastening holes 64a, 74a.

In the present example, in order to make the strengths of the load bearing portions 65a to 65c, 75a, 75c different from each other, a portion of the first fastening holes 64b, 64c, 74c has an approximately C-shaped circumferential edge. However, any other configuration can be adopted as long as the strengths of the foremost load bearing portions 65a, 75a are higher than the strengths of the other load bearing portions 65b, 65c, 75c. For example, the central and rear load bearing portions 65b, 65c, 75c may be provided with a cut or a groove extending in the vehicle width direction. The widths of the central and rear load bearing portions 65b, 65c, 75c may be smaller than the widths of the front load bearing portions 65a, 75a.

Figure 21:
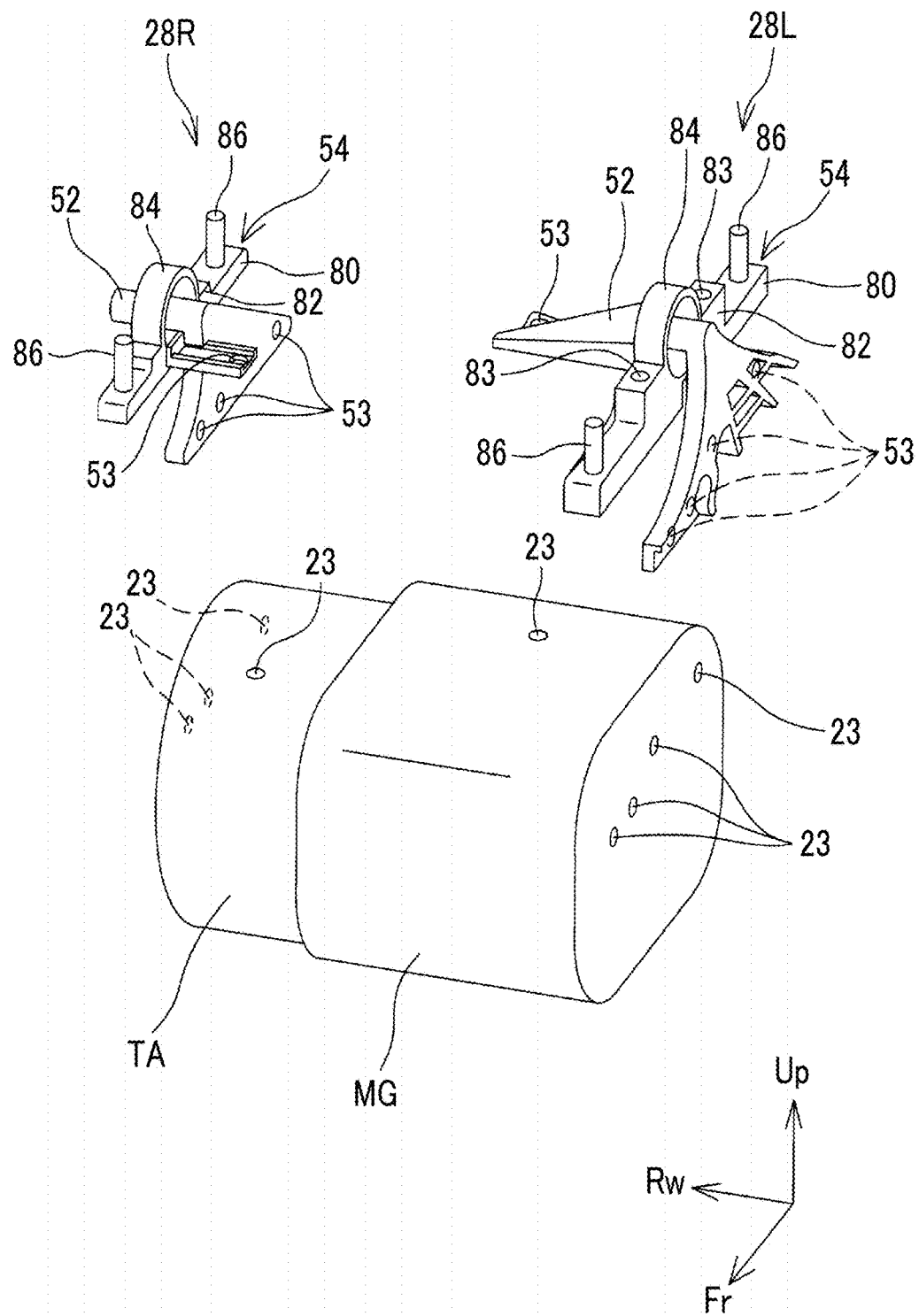
FIG. 21 is a perspective view of the rotating electrical machine unit and the motor mounts.

The rotating electrical machine unit 22 and the motor mounts 28 will be described. FIG. 21 is a perspective view of the rotating electrical machine unit 22 and the motor mounts 28. As described above, the rotating electrical machine unit 22 is provided with the rotating electrical machine MG which is a drive source of the vehicle and the transmission TA. The fastening holes 23 used to fasten the rotating electrical machine unit 22 to the motor mounts 28 are formed in the opposite ends of the rotating electrical machine unit 22 in the width direction and the upper surface of the rotating electrical machine unit 22. The rotating electrical machine unit 22 is connected to the MC cross-member 20 via the right motor mount 28R and the left motor mount 28L.

The motor mount 28 can be classified into the MG side fastening portion 52 fastened to the rotating electrical machine unit 22 and the member side fastening portion 54 fastened to the MC cross-member 20. The fastening holes 53 used to fasten the MG side fastening portion 52 to the rotating electrical machine unit 22 are formed in the MG side fastening portion 52.

The member side fastening portion 54 crosses over the opening portion 34 of the MC cross-member 20 in the vehicle front-rear direction and is fastened to a bottom surface of the MC cross-member 20. The member side fastening portion 54 can be classified into a base portion 80 that is fastened to the bottom surface of the MC cross-member 20, a protruding portion 82 that protrudes upward from the center of the base portion 80, and an arc portion 84 that protrudes upward from the center of the protruding portion 82.

A dimension of the base portion 80 in the vehicle front-rear direction is larger than a distance between a rear end of the front cross portion 20F of the MC cross-member 20 and a front end of the rear cross portion 20R. The base portion 80 is fastened to a bottom surface of the front cross portion 20F and a bottom surface of the rear cross portion 20R. Stud bolts 86 used to fasten the base portion 80 to the bottom surfaces of the front cross portion 20F and the rear cross portion 20R protrude from an upper surface of the base portion 80. A dimension of the protruding portion 82 in the vehicle front-rear direction is smaller than the distance between the rear end of the front cross portion 20F and the front end of the rear cross portion 20R, and is larger than a dimension of the opening portion 34 in the front-rear direction. The left motor mount 28L is fastened to a peripheral edge of the opening portion 34 via fastening holes 83 formed in the protruding portion 82. The arc portion 84 forms a space into which the MG side fastening portion 52 is allowed to be inserted.

FIG. 22 is a schematic sectional view illustrating a state where the member side fastening portion 54 of the left motor mount 28L is fastened to the MC cross-member 20. Here, as is apparent from FIG. 22, the base portion 80 is fastened to the MC cross-member 20 with the base portion 80 straddling the opening portion 34 of the MC cross-member 20 in the front-rear direction. Since the structure as described above is adopted, the motor mounts 28 function as reinforcing members for the MC cross-member 20. That is, at the time of the full-wrap collision, a rearward collision load may be applied to the front end of the MC cross-member 20. When the front cross portion 20F receives the collision load, the front cross portion 20F becomes about to be deformed in a direction in which the opening portion 34 is crushed. In order for the front cross portion 20F to be deformed toward the vehicle rear side, the member side fastening portion 54 connected to the front cross portion 20F and the rear cross portion 20R needs to be compressed and deformed in the vehicle front-rear direction. However, the member side fastening portion 54 is not likely to be compressed in the vehicle front-rear direction due to the shape thereof. Therefore, according to the present example, deformation of the MC cross-member 20 at the time of the full-wrap collision is effectively suppressed. When the member side fastening portion 54 is fastened to the MC cross-member 20 such that the member side fastening portion 54 crosses over the opening portion 34, the torsional rigidity of the MC cross-member 20 is improved. Therefore, vibration of the MC cross-member 20 at the time of normal driving and generation of noise caused by the vibration are suppressed.

As is apparent from FIG. 22, the protruding portion 82 of the member side fastening portion 54 is disposed between the front cross portion 20F and the rear cross portion 20R that are disposed while being separated from each other in the front-rear direction. Therefore, when the front cross portion 20F becomes about to be deformed rearward at the time of the full-wrap collision, the front cross portion 20F abuts onto the protruding portion 82. Since the front cross portion 20F abuts onto the protruding portion 82, the front cross portion 20F is restrained from moving further rearward and deformation of the front cross portion 20F is inhibited. That is, since the protruding portion 82 of the member side fastening portion 54 is disposed between the front cross portion 20F and the rear cross portion 20R, deformation of the MC cross-member 20 (particularly, deformation by which opening portion 34 is crushed) is more effectively suppressed.

As is apparent from FIG. 22, the stud bolts 86 with which the base portion 80 and the front and rear cross portions 20F, 20R are fastened to each other penetrate the closed sections of the front and rear cross portions 20F, 20R as with the first fastening bolts 66a, 66c fastened to the supporting bracket. That is, a collar 90 is disposed in each of the closed sections of the front and rear cross portions 20F, 20R and the stud bolts 86 and the nuts 88 hold the base portion 80 (motor mount 28), the lower members 38, the collars 90, and the upper member 36 together. Therefore, the attachment rigidity of the stud bolts 86 can be improved. Since the torsional rigidity of the MC cross-member 20 is improved, bending or deformation of the MC cross-member 20 can be effectively suppressed.

All of the high-voltage components such as the rotating electrical machine unit 22, the charger 26, and the PCU 24 are attached such that the front ends thereof are disposed behind the front end of the MC cross-member 20. Therefore, a collision load at the time of the full-wrap collision is applied to the MC cross-member 20 before being applied to the rotating electrical machine unit 22, the charger 26, and the PCU 24. In the above description, the member side fastening portion 54 extends in a direction parallel to the vehicle front-rear direction. However, the member side fastening portion 54 may be fastened to the MC cross-member 20 while extending in a direction inclined with respect to the vehicle front-rear direction as long as the member side fastening portion 54 is suspended between the front cross portion 20F and the rear cross portion 20R.

The behaviors of each component at the time of a frontal collision will be described. Behaviors at the time of the full-wrap collision in which substantially the entire width of the vehicle front portion collides with a collision object will be described. In the case of the full-wrap collision, a collision load is input to substantially the entire surface of the bumper RF 14. A portion of the collision load is absorbed with the crash boxes 16 compressed and deformed. The remainder of the collision load that is not absorbed by the crash boxes 16 is transmitted to the front ends of the front side members 12. The front side members 12 try to withstand the collision load but the front side members 12 are deformed (bent or curved) to escape from the collision load in a case where the collision load is so large that the front side members 12 cannot withstand the collision load. In the above-described process, the bumper RF 14 is moved toward the vehicle rear side and a portion of the collision load is input to the MC cross-member 20 directly from the bumper RF 14 or via another member interposed between the bumper RF 14 and the MC cross-member 20.

When a collision load in a direction toward the vehicle rear side is applied to the MC cross-member 20, the front cross portion 20F of the MC cross-member 20, the front cross portion 20F of the MC cross-member 20 becomes about to be deformed in a direction in which the opening portion 34 is crushed. However, the member side fastening portion 54 of the motor mount 28 is connected to the front cross portion 20F and the rear cross portion 20R such that the member side fastening portion 54 crosses over the opening portion 34. The member side fastening portion 54 functions as a reinforcement member that restrains the MC cross-member 20 from being deformed in the front-rear direction. Since the member side fastening portion 54 is connected to the front cross portion 20F and the rear cross portion 20R, relative displacement of the two cross portions 20F, 20R is restrained and deformation of the MC cross-member 20 is suppressed.

Even if the front cross portion 20F and the member side fastening portion 54 are disconnected from each other due to damage or the like to the stud bolts 86 or the bolts 92 connecting the front cross portion 20F and the member side fastening portion 54 to each other, the protruding portion 82 of the member side fastening portion 54 is interposed between the front cross portion 20F and the rear cross portion 20R. Therefore, even when the front cross portion 20F becomes about to move rearward, the front cross portion 20F abuts onto the protruding portion 82 and the front cross portion 20F is restrained from moving further rearward. As a result, deformation of the MC cross-member 20 is suppressed.

Since deformation of the MC cross-member 20 is suppressed, the high-voltage cable inserted into the opening portion 34 is effectively suppressed from being clamped. Furthermore, the high-voltage components such as the rotating electrical machine unit 22, the PCU 24, and the charger 26 installed onto the MC cross-member 20 are more appropriately protected. In addition, the PCU, the water heater, or the like may be disposed in the opening portion 34 of the MC cross-member such that the high-voltage components can be protected from a collision load.

Behaviors at the time of the small overlap collision or the oblique collision will be described. In this case, a collision load is applied to the gusset 18 that protrudes outward further than the front side member 12. The collision load applied to the gusset 18 is transmitted to a side surface of the front side member 12 via the gusset 18. In this case, a stress caused by the collision load is likely to be concentrated to the rear end of the gusset 18 or the discontinuation position 42 of the reinforcement rib 40. As a result, the front side member 12 is bent inward in the vehicle width direction near the rear end of the gusset 18 or near the discontinuation position 42 of the reinforcement rib 40. In this case, the MC cross-member 20 and the front side member 12 face each other in a state of being separated from each other in the vehicle width direction at the same position as the stress concentration zone (rear end of gusset 18 or discontinuation position 42 of reinforcement rib 40) in the vehicle front-rear direction. In other words, a sufficient space in which the front side member 12 is bent inward in the vehicle width direction is secured between the front side member 12 and the MC cross-member 20. Therefore, according to the present example, the front side member 12 can be reliably bent inward in the vehicle width direction.

When the front side member 12 is bent, as illustrated in FIG. 13, a fastening position between the front side member 12 and the supporting bracket is also changed. When the fastening position is changed, the circumferential edges of the central and rear first fastening holes 64*b*, 64*c*, 74*c* are broken and the first fastening holes 64*b*, 64*c*, 74*c* are separated from the fastening bolts. Therefore, the supporting bracket can rotate about the foremost first fastening holes 64*a*, 74*a* following the displacement of the fastening position of the front side member 12. Accordingly, the front side member 12 can be more reliably bent.

When the front side member is bent inward in the vehicle width direction, the side surface of the MC cross-member 20 is pressed inward in the vehicle width direction by a bent portion of the front side member 12. In this case, the front side member 12 becomes about to move inward in the vehicle width direction and toward the vehicle rear side. However, since the bent portion of the front side member 12 caught on the projecting wall 62 provided on the side surface of the MC cross-member 20, the front side member 12 is effectively restrained from moving rearward. Therefore, a collision load is more reliably transmitted to the MC cross-member 20 from the front side member 12.

A collision load input to the side portion 20S of the MC cross-member 20 that is on the one side is transmitted to the side portion 20S on the opposite side via the front cross portion 20F and the rear cross portion 20R. The side portion 20S on the opposite side abuts onto the front side member 12 on the opposite side and presses the front side member 12 on the opposite side. Therefore, the collision load is transmitted to the front side member 12 on the opposite side. The front side member 12 on the opposite side absorbs a portion of the collision load and is displaced in the vehicle width direction to avoid the collision load. That is, the entire vehicle body is displaced in the vehicle width direction so as to escape from the collision load. As a result, an occupant or the high-voltage component can be effectively protected.

As is apparent from the above description, in the case of the supporting structure for the vehicle high-voltage unit and the vehicle front portion structure 10 according to the present disclosure, the motor mount 28 is suspended between the front cross portion 20F and the rear cross portion 20R. Therefore, deformation of the front cross portion 20F, particularly deformation by which the opening portion 34 is crushed is effectively suppressed. When a configuration in which the protruding portion 82 which is a portion of the motor mount 28 is positioned in a gap between the front cross portion 20F and the rear cross portion 20R is adopted, deformation of the front cross portion 20F is suppressed by the protruding portion 82 even if the motor mount 28 and the front cross portion 20F are disconnected from each other. The configuration described so far is merely an example and other configurations may be appropriately modified as long as the motor mount 28 is suspended between the front cross portion 20F and the rear cross portion 20R.

For example, in the above-described example, the MC cross-member 20 has an approximately rectangular shape with the central portion thereof provided with the opening portion 34. However, the MC cross-member 20 may have any other shape as long as the MC cross-member 20 is provided with the front cross portion 20F and the rear cross portion 20R. Therefore, the MC cross-member 20 may have a shape in which two bridge portions that are suspended between the front cross portion 20F and the rear cross portion 20R in an approximately X-shape are provided instead of the side portion 20S. In the above description, the motor mount 28 is fastened to the bottom surface of the MC cross-member 20. However, the motor mount 28 may be fastened to the upper surface of the MC cross-member 20. For example, the motor mount 28 may be connected to the upper surface of the MC cross-member 20 and the rotating electrical machine unit 22 may be connected to the upper portion of the MC cross-member 20 via the motor mount 28. Positions at which the supporting brackets 32A, 32B are fastened (fastening holes 15A, 15B of front side member 12A and fastening holes 15C, 15D of front side member 12B) may be at the same positions as positions at which mounts are fastened in an engine vehicle. That is, a portion of the vehicle front portion structure such as the front side member 12 may be shared by a vehicle in which an engine is provided as a power unit.

Hereinabove, the embodiment of the present disclosure has been described in detail. However, an aspect of the present disclosure is not limited to the embodiment and various changes or modifications can be made without departing from the spirit of the present disclosure described in the claims.

What is claimed is:

1. A vehicle front portion structure comprising:
   a pair of front side members extending in a vehicle front-rear direction, the front side members being disposed at an interval in a vehicle width direction;
   an MC cross-member suspended between the front side members, the MC cross-member being provided with a front cross portion extending in the vehicle width direction and a rear cross portion provided behind the front cross portion and extending in the vehicle width direction; and
   a motor mount configured to connect a high-voltage component to the MC cross-member, the motor mount being suspended between the front cross portion and the rear cross portion.

2. The vehicle front portion structure according to claim 1, wherein:
   the MC cross-member is provided with
      an upper member that forms an upper surface of the MC cross-member, and lower members that form a bottom surface of the MC cross-member;
the upper member and the lower members are connected to each other such that a closed section is formed; and
a bolt penetrating the closed section and a nut screwed onto the bolt hold the motor mounts, the upper member, and the lower members together.

3. The vehicle front portion structure according to claim 1, wherein:
the motor mount is provided with
a base portion that is fastened to bottom surfaces or upper surfaces of the front cross portion and the rear cross portion, and
a protruding portion that protrudes in a vehicle height direction from a central portion of the base portion; and
when the base portion is fastened to the front cross portion and the rear cross portion, the protruding portion is positioned in a gap between the front cross portion and the rear cross portion.

4. The vehicle front portion structure according to claim 1, further comprising a gusset which is attached to each of outer surfaces of the front side members in the vehicle width direction, which protrudes outward in the vehicle width direction further than the front side members, and of which a dimension in the vehicle width direction becomes smaller toward a vehicle rear side,
wherein the MC cross-member and the front side members face each other in a state of being separated from each other in the vehicle width direction at the same position as a rear end of the gusset in the vehicle front-rear direction.

5. The vehicle front portion structure according to claim 4, wherein:
one or more projecting walls are provided on an outer surface of the MC cross-member in the vehicle width direction at the same position as the rear end of the gusset in the vehicle front-rear direction or at a position behind the rear end of the gusset in the vehicle front-rear direction; and
the projecting wall projects outward in the vehicle width direction further than a portion of the outer surface that is ahead of the projecting wall.

6. The vehicle front portion structure according to claim 5, wherein:
an end surface of each of the front side members in the vehicle width direction is provided with a reinforcement rib extending in the vehicle front-rear direction, the reinforcement rib being partially discontinuous; and
the projecting wall is provided at the same position as a discontinuation position of the reinforcement rib in the vehicle front-rear direction or at a position behind the discontinuation position of the reinforcement rib in the vehicle front-rear direction.

7. The vehicle front portion structure according to claim 4, wherein a height dimension of an end portion of the MC cross-member in the vehicle width direction is larger than a height dimension of a central portion of the MC cross-member in the vehicle width direction.

8. The vehicle front portion structure according to claim 4, further comprising supporting brackets configured to connect the MC cross-member and the front side members to each other in a state where the MC cross-member and the front side members are separated from each other in the vehicle width direction.

9. The vehicle front portion structure according to claim 8, wherein:
the MC cross-member is provided with
an upper member that forms an upper surface of the MC cross-member, and
lower members that form a bottom surface of the MC cross-member;
the upper member and the lower members are connected to each other such that a closed section is formed; and
first fastening bolts penetrating the closed section and nuts screwed onto the first fastening bolts hold the supporting brackets, the upper member, and the lower members together.

10. The vehicle front portion structure according to claim 8, wherein:
the supporting brackets are fastened to the MC cross-member and the front side members at a position behind the rear end of the gusset in the vehicle front-rear direction;
each of the supporting brackets is provided with a plurality of first fastening holes, the first fastening holes being used to fasten the supporting brackets to the MC cross-member and being arranged in the vehicle front-rear direction;
load bearing portions as predetermined gap portions are respectively interposed between the first fastening holes and inner end portions of the supporting brackets in the vehicle width direction; and
a strength of the foremost load bearing portion is higher than that of the other load bearing portions.

11. The vehicle front portion structure according to claim 4, wherein the MC cross-member is further provided with a pair of side portions configured to connect end portions of the front cross portion and the rear cross portion to each other.

12. A supporting structure for a vehicle high-voltage unit, the supporting structure comprising:
a pair of motor mounts attached to opposite ends of a rotating electrical machine unit in a width direction; and
an MC cross-member of which opposite ends in a vehicle width direction are fastened to a pair of front side members extending in a vehicle front-rear direction, the rotating electrical machine unit being attached to a lower portion of the MC cross-member via the motor mounts and a high-voltage device being attached to an upper portion of the MC cross-member, wherein:
an opening portion vertically penetrating the MC cross-member is formed in a central portion of the MC cross-member; and
front and rear end portions of each of the motor mounts are fastened to the MC cross-member with the opening portion of the MC cross-member interposed between the front and rear end portions of each of the motor mounts in the vehicle front-rear direction.

13. The vehicle front portion structure according to claim 1, wherein the motor mount extends from the front cross portion to the rear cross portion in the vehicle front-rear direction.

14. The vehicle front portion structure according to claim 1, wherein the motor mount comprises a MC cross-member fastening portion and a motor fastening portion, the MC cross-member fastening portion extends in the vehicle front-rear direction and is coupled with the front cross portion and the rear cross portion, and the motor fastening portion is in a gap between the front cross portion and the rear cross portion.

15. The vehicle front portion structure according to claim 14, wherein the motor mount is a first motor mount and the vehicle front portion structure further comprises:
a second motor mount configured to connect the high-voltage component to the MC cross-member, the second motor mount being suspended between the front cross portion and the rear cross portion.

16. The vehicle front portion structure according to claim 15, wherein the second motor mount comprises a portion that straddles the gap between the front cross portion and the rear cross portion.

17. A vehicle front portion structure comprising:
a first front side member extending in a vehicle front-rear direction;
a second front side member extending in the vehicle front-rear direction, the second front side member being separated from the first front side member by an interval in a vehicle width direction;
an MC cross-member suspended between the first front side member and the second front side member such that the MC cross-member is separated from the first front side member and the second side member by a clearance, the MC cross-member comprising:
a front cross portion extending in the vehicle width direction;
a rear cross portion separated from the front cross portion in the vehicle front-rear direction and extending in the vehicle width direction;
a first side portion between the front cross portion and the rear cross portion; and
a second side portion between the front cross portion and the rear cross portion, the second side portion being separated from the second side portion in the vehicle width direction; and
motor mounts configured to connect a high-voltage component to the MC cross-member, the motor mounts being suspended between the first side portion, the second side portion, the front cross portion and the rear cross portion.

18. The vehicle front portion structure according to claim 17, wherein the MC cross-member is suspended by a bracket between the first front side member and the second front side member.

19. The vehicle front portion structure according to claim 17, wherein at least one of the motor mounts extends from the front cross portion to the rear cross portion in the vehicle front-rear direction.

20. The vehicle front portion structure according to claim 17, wherein the at least one of the motor mounts comprises a MC cross-member fastening portion and a motor fastening portion, the MC cross-member fastening portion extends the in the vehicle front-rear direction and is coupled with the front cross portion and the rear cross portion, the motor fastening portion is in a gap between the front cross portion and the rear cross portion, and the MC cross-member fastening portion straddles the gap between the front cross portion and the rear cross portion.

* * * * *